United States Patent
Robshaw et al.

(10) Patent No.: US 12,169,752 B1
(45) Date of Patent: *Dec. 17, 2024

(54) ENHANCED RFID TAG AUTHENTICATION

(71) Applicant: Impinj, Inc., Seattle, WA (US)

(72) Inventors: Matthew Robshaw, Seattle, WA (US); Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,083

(22) Filed: Jun. 10, 2022

Related U.S. Application Data

(63) Continuation of application No. 16/871,101, filed on May 11, 2020, now Pat. No. 11,361,174, which is a continuation of application No. 16/180,140, filed on Nov. 5, 2018, now Pat. No. 10,650,202, which is a continuation of application No. 15/911,730, filed on Mar. 5, 2018, now Pat. No. 10,121,033, which is a continuation-in-part of application No. 15/680,639, filed on Aug. 18, 2017, now Pat. No. 9,916,483, which is a continuation of application No. 14/602,173, filed on Jan. 21, 2015, now Pat. No. 9,792,472, which is a continuation-in-part of application No. 14/207,525, filed on Mar. 12, 2014, now abandoned, which is a continuation-in-part of application No. 14/106,522, filed on Dec. 13, 2013, now Pat. No. 9,940,490, said application No. 15/911,730 is a continuation-in-part of application (Continued)

(51) Int. Cl.
*G06K 7/10* (2006.01)
*H04L 9/32* (2006.01)

(52) U.S. Cl.
CPC ..... *G06K 7/10366* (2013.01); *G06K 7/10198* (2013.01); *H04L 9/3247* (2013.01); *H04L 9/3271* (2013.01); *H04L 2209/805* (2013.01)

(58) Field of Classification Search
CPC ............ G06K 7/10366; G06K 7/10198; H04L 9/3247; H04L 9/3271; H04L 2209/805
See application file for complete search history.

(56) References Cited

U.S. PATENT DOCUMENTS

| | | |
|---|---|---|
| 5,327,570 A | 7/1994 | Foster et al. |
| 5,467,081 A | 11/1995 | Drews et al. |

(Continued)

OTHER PUBLICATIONS

Final Office Action received for U.S. Appl. No. 13/308,123, dated May 22, 2014 and filed Nov. 30, 2011.

(Continued)

*Primary Examiner* — Curtis J King
(74) *Attorney, Agent, or Firm* — Turk IP Law, LLC

(57) ABSTRACT

An authentication method includes RFID tags authenticating RFID readers. A tag sends a tag identifier and a reader challenge to a reader in response to one or more commands from the reader. The reader then either derives a response to the reader challenge itself or has a verification authority derive the response. The response may be derived from parameter(s) in the reader challenge, and may be derived using a cryptographic key. The reader then sends the response to the tag along with one or more commands. The tag verifies the response before executing action(s) associated with the command(s).

20 Claims, 18 Drawing Sheets

Related U.S. Application Data

No. 14/030,854, filed on Sep. 18, 2013, now Pat. No. 9,911,018, which is a continuation-in-part of application No. 13/349,297, filed on Jan. 12, 2012, now abandoned, said application No. 14/106,522 is a continuation-in-part of application No. 13/308,123, filed on Nov. 30, 2011, now abandoned.

(60) Provisional application No. 61/783,403, filed on Mar. 14, 2013, provisional application No. 61/748,719, filed on Jan. 3, 2013, provisional application No. 61/737,376, filed on Dec. 14, 2012, provisional application No. 61/485,018, filed on May 11, 2011, provisional application No. 61/438,613, filed on Feb. 1, 2011, provisional application No. 61/433,518, filed on Jan. 17, 2011.

(56) References Cited

U.S. PATENT DOCUMENTS

| | | | |
|---|---|---|---|
| 5,477,215 A * | 12/1995 | Mandelbaum | G06K 7/0008 340/928 |
| 5,539,826 A | 7/1996 | Dwork et al. | |
| 5,583,487 A * | 12/1996 | Ackerman | H04L 12/413 340/5.91 |
| 5,818,348 A * | 10/1998 | Walczak | G06K 7/0008 340/10.3 |
| 5,832,090 A | 11/1998 | Raspotnik | |
| 5,903,544 A | 5/1999 | Sakamoto et al. | |
| 5,909,183 A * | 6/1999 | Borgstahl | G08C 19/28 370/278 |
| 5,940,006 A * | 8/1999 | MacLellan | G01S 13/825 340/505 |
| 5,973,613 A * | 10/1999 | Reis | G01S 13/74 340/10.2 |
| 6,172,596 B1 * | 1/2001 | Cesar | G06K 7/10039 340/10.41 |
| 6,842,106 B2 | 1/2005 | Hughes et al. | |
| 7,245,213 B1 * | 7/2007 | Esterberg | H04L 63/0492 235/382 |
| 7,295,101 B2 * | 11/2007 | Ward | G06K 7/10386 710/15 |
| 7,450,010 B1 | 11/2008 | Gravelle et al. | |
| 7,532,104 B2 | 5/2009 | Juels | |
| 7,734,046 B2 | 6/2010 | Urban et al. | |
| 7,791,451 B2 | 9/2010 | Lei et al. | |
| 7,844,505 B1 * | 11/2010 | Arneson | G06Q 10/087 705/28 |
| 8,049,594 B1 | 11/2011 | Baranowski | |
| 8,149,155 B2 | 4/2012 | Kawai | |
| 8,154,405 B2 | 4/2012 | Gravelle et al. | |
| 8,228,173 B2 | 7/2012 | Missimer et al. | |
| 8,259,942 B2 | 9/2012 | Ala-Laurila et al. | |
| 8,373,786 B2 | 2/2013 | Otsuka et al. | |
| 8,378,786 B2 | 2/2013 | Bailey et al. | |
| 8,559,642 B2 | 10/2013 | Wurm | |
| 8,595,506 B2 | 11/2013 | Robshaw et al. | |
| 8,866,594 B1 | 10/2014 | Diorio et al. | |
| 8,941,469 B1 | 1/2015 | Diorio et al. | |
| 9,000,891 B2 | 4/2015 | Daneshmand et al. | |
| 9,024,729 B1 | 5/2015 | Diorio et al. | |
| 9,111,283 B1 | 8/2015 | Diorio et al. | |
| 9,405,945 B1 | 8/2016 | Diorio et al. | |
| 2003/0198082 A1 | 10/2003 | Silverbrook et al. | |
| 2004/0035919 A1 | 2/2004 | Horng | |
| 2004/0066278 A1 | 4/2004 | Hughes et al. | |
| 2004/0111607 A1 | 6/2004 | Yellepeddy | |
| 2004/0222878 A1 | 11/2004 | Juels | |
| 2005/0021757 A1 | 1/2005 | Helliwell | |
| 2005/0058292 A1 | 3/2005 | Diorio et al. | |
| 2005/0110640 A1 | 5/2005 | Chung | |
| 2005/0160273 A1 | 7/2005 | Oishi | |
| 2005/0183047 A1 | 8/2005 | Sapiro | |
| 2005/0280506 A1 * | 12/2005 | Lobanov | G06K 7/0008 340/572.1 |
| 2006/0077034 A1 | 4/2006 | Hillier | |
| 2006/0174129 A1 | 8/2006 | Brignone et al. | |
| 2006/0181397 A1 | 8/2006 | Limbachiya | |
| 2006/0187048 A1 | 8/2006 | Curkendall et al. | |
| 2006/0197651 A1 * | 9/2006 | Lee | H04B 5/02 340/10.3 |
| 2006/0230276 A1 | 10/2006 | Nochta | |
| 2006/0235805 A1 | 10/2006 | Peng et al. | |
| 2006/0273883 A1 | 12/2006 | Pillai et al. | |
| 2006/0288224 A1 | 12/2006 | Won et al. | |
| 2007/0057768 A1 | 3/2007 | Zeng et al. | |
| 2007/0106897 A1 | 5/2007 | Kulakowski | |
| 2007/0143853 A1 | 6/2007 | Tsukamoto | |
| 2007/0186105 A1 | 8/2007 | Bailey et al. | |
| 2007/0194889 A1 * | 8/2007 | Bailey | H04L 9/321 340/10.51 |
| 2007/0230359 A1 | 10/2007 | Tanaka | |
| 2008/0014989 A1 * | 1/2008 | Sandegard | G06F 3/0346 340/572.1 |
| 2008/0211637 A1 | 9/2008 | Smith | |
| 2008/0258864 A1 | 10/2008 | Hattori et al. | |
| 2008/0271115 A1 | 10/2008 | Maubach et al. | |
| 2008/0315994 A1 * | 12/2008 | Maltseff | G01S 13/765 340/10.1 |
| 2009/0219132 A1 | 9/2009 | Maytal et al. | |
| 2010/0001840 A1 | 1/2010 | Kang et al. | |
| 2010/0153719 A1 | 6/2010 | Duc et al. | |
| 2010/0153731 A1 | 6/2010 | Duc et al. | |
| 2010/0277287 A1 * | 11/2010 | Choi | H04L 9/3273 340/10.42 |
| 2010/0308978 A1 | 12/2010 | Brown | |
| 2011/0066853 A1 | 3/2011 | Engels et al. | |
| 2011/0185409 A1 | 7/2011 | Chien et al. | |
| 2011/0291803 A1 | 12/2011 | Bajic et al. | |
| 2011/0320805 A1 | 12/2011 | Chaves et al. | |
| 2012/0008767 A1 | 1/2012 | Smith et al. | |
| 2012/0200386 A1 | 8/2012 | Robshaw et al. | |
| 2012/0300937 A1 | 11/2012 | Burbridge et al. | |
| 2013/0043982 A1 | 2/2013 | Robshaw et al. | |
| 2014/0023195 A1 | 1/2014 | Lee et al. | |

OTHER PUBLICATIONS

Non-Final Office Action U.S. Appl. No. 13/901,073 dated Sep. 13, 2013.

Non-Final Office Action Issued in U.S. Appl. No. 14/602,173 dated Feb. 15, 2017, 17 Pages.

Notice of Allowance received for U.S. Appl. No. 14/106,522 dated Nov. 30, 2017.

Office Action received for U.S. Appl. No. 13/308,123, dated Oct. 8, 2013 and filed Nov. 30, 2011.

Office Action received for U.S. Appl. No. 13/349,297, dated May 22, 2015 and filed Jan. 12, 2012.

Office Action received for U.S. Appl. No. 13/441,285, dated Aug. 12, 2014 and filed Apr. 6, 2012.

Office Action received for U.S. Appl. No. 14/207,525, dated Apr. 29, 2016 and filed Mar. 12, 2014.

Office Action received for U.S. Appl. No. 14/602,173, dated May 2, 2016 and filed Jan. 21, 2015.

Office Action received for U.S. Appl. No. 14/677,219 dated Oct. 7, 2015 and filed Apr. 2, 2015.

Office Action received for U.S. Appl. No. 16/871,101, dated Oct. 27, 2021 and filed Jan. 21, 2022.

EPC™ Radio-Frequency Identity Protocols Class-1 Generation-2 UHF RFID Protocol for Communications at 860 MHz-960 MHz Version 1.2.0, Oct. 23, 2008, 108 pages.

* cited by examiner

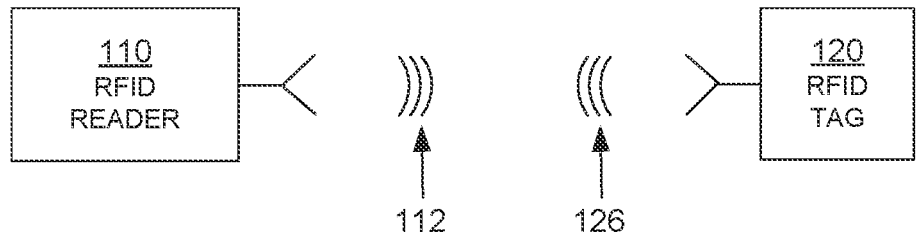
FIG. 1
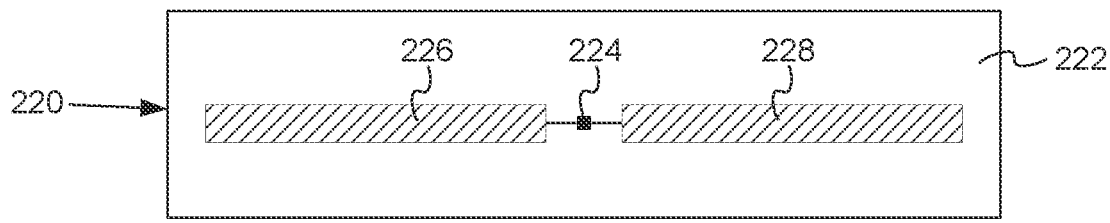
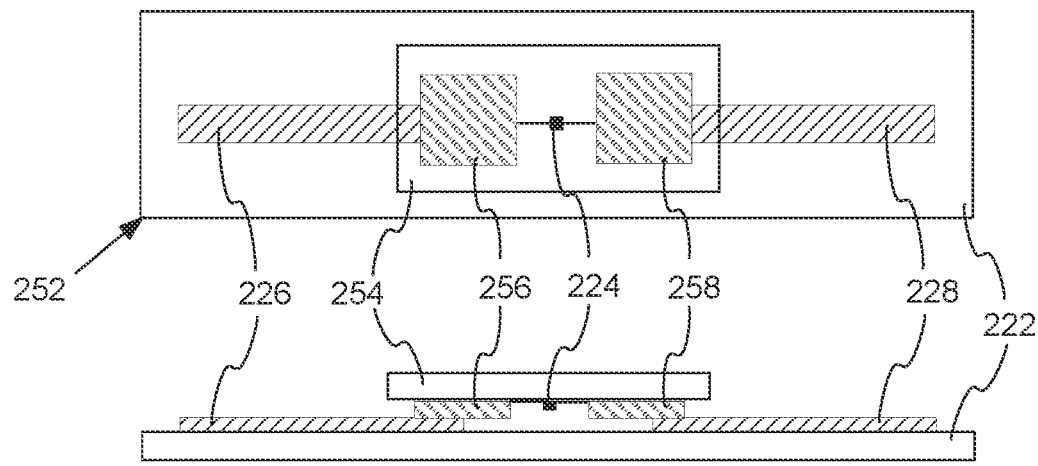
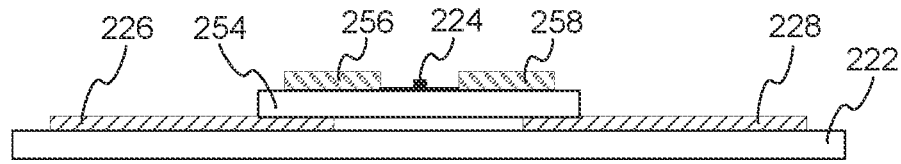
FIG. 2

ENHANCED RFID TAG AUTHENTICATION

CROSS REFERENCE TO RELATED APPLICATIONS

This application is a continuation of U.S. patent application Ser. No. 16/871,101 filed on May 11, 2020, which is a continuation of U.S. patent application Ser. No. 16/180,140 filed on Nov. 5, 2018, which is a continuation of U.S. patent application Ser. No. 15/911,730 filed on Mar. 5, 2018, which is a continuation-in-part of U.S. patent application Ser. No. 15/680,639 filed on Aug. 18, 2017, which is a continuation of U.S. patent application Ser. No. 14/602,173 filed on Jan. 21, 2015, which is a continuation-in-part of U.S. patent application Ser. No. 14/207,525 filed Mar. 12, 2014, which is a continuation-in-part of U.S. patent application Ser. No. 14/106,522 filed on Dec. 13, 2013, claims the benefit of U.S. Provisional Patent Application Ser. No. 61/737,376 filed on Dec. 14, 2012 and is a continuation-in-part of U.S. patent application Ser. No. 13/308,123 filed on Nov. 30, 2011, which claims the benefit of U.S. Provisional Patent Application Ser. No. 61/438,613 filed on Feb. 1, 2011. The U.S. patent application Ser. No. 14/207,525 also claims the benefit of U.S. Provisional Patent Application Ser. No. 61/783,403. The U.S. patent application Ser. No. 15/911,730 also is a continuation-in-part of U.S. patent application Ser. No. 14/030,854 filed Sep. 18, 2013, which claims the benefit of U.S. Provisional Patent Application Ser. No. 61/748,719 and is a continuation-in-part of U.S. patent application Ser. No. 13/349,297 filed Jan. 12, 2012, which claims the benefit of U.S. Provisional Patent Applications Ser. Nos. 61/485,018 and 61/433,518. The disclosures of these applications are hereby incorporated by reference for all purposes.

BACKGROUND

Radio-Frequency Identification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on.

An RFID tag may include an RFID integrated circuit (IC) coupled to an antenna. The RFID tag or IC may include an antenna subsystem, a radio subsystem including a modem, a power management section, a logical section, and a memory. In some RFID tags the logical section may include a cryptographic algorithm which, in many instances, relies on one or more passwords or keys stored in tag memory. In some RFID tags the power management section may include an energy storage device such as a battery. RFID tags with an energy storage device are known as active or battery-assisted tags. Advances in semiconductor technology have miniaturized the electronics so much that an RFID tag can be powered solely by the RF signal it receives. Such RFID tags do not include an energy storage device such as a battery, and are called passive tags. Regardless of the type, all tags typically store or buffer some energy temporarily in passive storage devices such as capacitors.

Counterfeiting is a problem in many areas of global commerce. For example, retail-goods manufacturers, such as manufacturers of luxury clothing or purses, often find counterfeit items in the marketplace. Many commercial enterprises envision using cryptographically secure RFID systems to ascertain whether a tagged item, or more particularly the tag attached to an item, is genuine and not counterfeit. However, these commercial applications are loathe to adopt anticounterfeiting systems that require password or key distribution, because securely managing and distributing passwords or keys among global trading partners is difficult.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

According to one example, a method for an RFID system to cause an RFID IC having a first parameter to execute an action is provided. The method may include sending a first command to the IC, receiving from the IC at least an identifier and an encrypted version of the first parameter, and determining a key using the received identifier. The method may further include recovering the first parameter from the encrypted version using the key, sending to the IC a single second command including at least a first portion of the first parameter, and causing the IC to execute an action defined by at least the second command upon verifying at least the first portion of the first parameter.

According to another example, a method for an RFID system to cause an RFID IC having a first parameter to execute an action is provided. The method may include sending a first command to the IC, receiving from the IC at least an identifier and an encrypted version of the first parameter, determining a key using the received identifier, and recovering the first parameter from the encrypted version using the key. The method may further include deriving a second parameter from the first parameter using a deriving operation that includes one of setting the second parameter equal to the first parameter, incorporating the first parameter into a string, and computing an arithmetic function of at least the first parameter. The method may further include sending to the IC a single second command including at least a first portion of the second parameter and causing the IC to, upon verifying at least the first portion of the second parameter using the deriving operation and the first parameter, execute an action defined by at least the second command, where the first parameter and the second parameter do not define the action.

According to a further example, a method for an RFID system to cause an RFID IC having a first parameter to execute an action is provided. The method may include sending a first command to the IC, receiving from the IC at least an identifier and an encrypted version of the first parameter, determining a key using the received identifier, and recovering the first parameter from the encrypted version using the key. The method may further include deriving a second parameter from the first parameter, sending to the IC a single second command including at least a portion of the second parameter and defining at least part of an IC action, and causing the IC to, upon verifying at least the first portion of the second parameter using the deriving operation and the first parameter, execute the IC action, where the first parameter and the second parameter do not define the IC action.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

DETAILED DESCRIPTION

Figure 3:
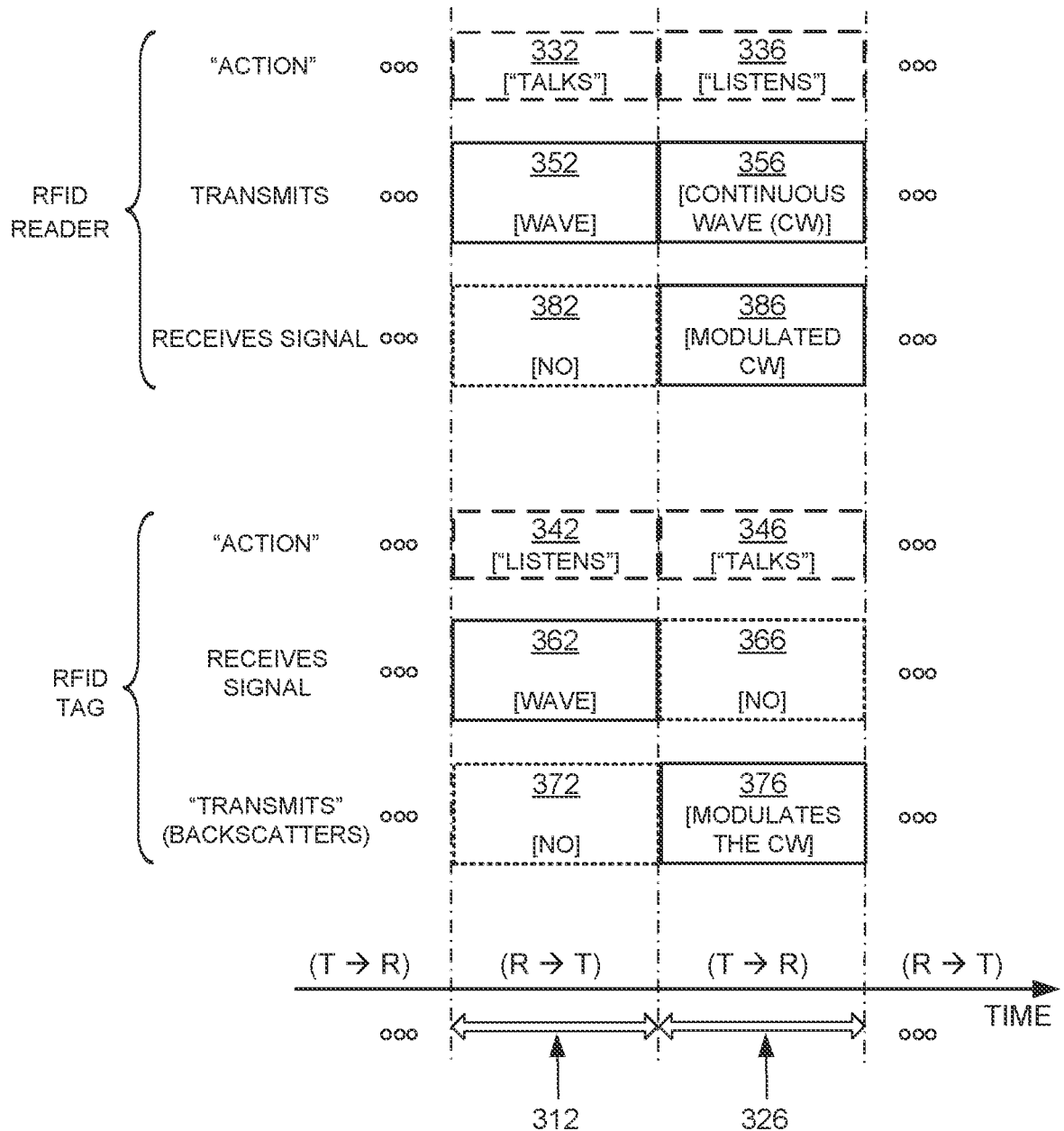
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

In some applications, RFID systems are called upon to ensure the authenticity of an item to which a tag is attached. In these systems, a reader challenges the tag and asks the tag to "prove" that it is genuine and not counterfeit. If the tag is genuine, then the item to which it is attached is presumed also to be genuine, especially if the tag is embedded into or onto the item and is difficult to alter or remove. In this case the task of preventing an item from being counterfeited essentially becomes a task of preventing the tag that is attached to the item from being counterfeited.

Preventing a tag from itself being counterfeited is difficult. For example, one way in which a tag can be counterfeited is by using a replay attack. In a replay attack, a counterfeiter listens to the communications between a reader and a legitimate tag and creates a counterfeit tag that mimics or "clones" the legitimate tag's response. To prevent such cloning, each time a reader challenges a tag both the reader and the tag should send different and unpredictable (at least unpredictable by the counterfeiter) messages. Typical cryptographic systems provide such unpredictability by having the reader send a different random challenge to the tag for each authentication, and having the tag generate a different response for each random challenge. In many systems, the tag also adds some of its own randomness to the challenge so as to further confound replay attacks. Many challenge-response methods are known and applicable to this use case. Some challenge-response methods use what are known as symmetric cryptographic algorithms, such as the Advanced Encryption Standard (AES). Others use what are known as asymmetric or public key cryptographic algorithms, such as the Rivest/Shamir/Adleman (RSA) algorithm.

Regardless of whether an RFID system uses a symmetric or an asymmetric cryptographic algorithm, each tag contains a stored secret, also known as a secret key, a private key, or sometimes just a key. Symmetric algorithms typically denote the stored secret as a "secret key". Asymmetric algorithms typically denote the stored secret as a "private key". For symmetric algorithms, the secret key is known to the interrogating reader but not to a counterfeiter. For asymmetric algorithms, only the tag knows its private key, but the tag discloses a public key which is freely available to readers and to potential counterfeiters alike. In either case, to authenticate a tag the reader sends a random challenge; the tag uses its cryptographic algorithm to compute a response from the challenge and its stored secret; the tag sends the response to the reader; and the reader verifies the response by decrypting it using the tag's secret key (symmetric algorithm) or public key (asymmetric algorithm). Of course, if all tags contained the same stored secret then the system would not be particularly secure, because if a counterfeiter managed to reverse-engineer a single tag and uncover the stored secret, then he knows the stored secret for all tags. To remedy this problem, RFID systems may use a multitude of stored secrets, ideally allocating a unique stored secret for each and every tag.

This approach appears simple and secure, but is problematic from a commercial standpoint. RFID tag vendors already sell billions of tags per year, and will sell tens of billions of tags per year in the very near future. With this massive proliferation of tags there will be a consequent proliferation of stored secrets and public keys, and no reader can possibly hope to store all keys for all tags. Worse, for a symmetric algorithm, suppose that a single reader did store all the secret keys. In this latter case a counterfeiter merely has to steal a single reader and "break" it to know all the secret keys for potentially billions of tags. For these reasons, a particular reader cannot or should not know every tag's secret key or public key, and without knowing a tag's secret or public key the reader cannot authenticate the tag.

One possible alternative for systems using asymmetric cryptographic algorithms is for the tag to store both the private and public key, and to divulge its public key upon interrogation by a reader. However, this solution is flawed, because a counterfeiter could then simply create counterfeit tags with legitimate private/public key pairs and readers will not be able to distinguish them from legitimate tags.

In embodiments as described herein every tag can have a unique private-public key pair but the reader only needs to know a single master public key. Of course, actual system implementations may choose to use more than one master private-public key pair, so that if one master key pair is compromised then not all tags are compromised, but the number of master key pairs can be much smaller than the number of tags deployed in the field. Finally, the reader is able to verify tag authenticity without needing access to any secret or to a network.

Tag authentication as described above is advantageous when network connectivity is unreliable or nonexistent. However, if network connectivity is available, network-based authentication may be desirable, due to lower complexity and tag computational requirements. According to embodiments, an RFID reader may attempt to authenticate tags employing keys, as described above. The reader is connected to a verification authority that can determine which key a particular tag employs by using a tag identifier as a table lookup or input to an algorithmic key generator.

To authenticate a tag in these embodiments, the reader interrogates the tag to determine the tag identifier, challenges the tag with a random number or string, receives a response from the tag, and then sends the identifier, challenge, and response to the verification authority. In some applications, each individual RFID tag or group of tags will contain a distinct key, and the verification authority can determine which key a particular tag employs by using the identifier as a table lookup or input to an algorithmic key generator. The tag computes its response from at least the challenge and the key, typically using a cryptographic algorithm. In some applications the tag may add some tag-generated randomness to the reader's challenge to enhance the security of the challenge-response algorithm. Because the verification authority must be able to reconstruct the challenge that the tag used in its computations, in these latter applications the tag either sends its tag-generated randomness to the reader for relaying to the verification authority, or provides sufficient information in its identifier and response for the verification authority to determine the tag-generated randomness algorithmically. In some applications, to further enhance security, the tag may encrypt its tag-generated randomness in an Initial Value (IV) and send the IV to the reader for relaying to the verification authority. In yet other applications the verification authority will generate the challenge and send it to the reader for relaying to the tag.

The verification authority uses the challenge and its knowledge of the tag's key and cryptographic algorithm to confirm or refute the tag's response and thereby ascertain the tag's or item's authenticity. In some applications, such as a consumer using an RFID-enabled mobile phone to interrogate a product (like a designer purse) prior to purchase, the verification authority will send a reply to the phone indicating whether the item is authentic or counterfeit. In other applications, such as a pharmaceutical distributor using an RFID-enabled handheld reader to interrogate a shipment (such as a case of medicine), the verification authority may send a notification to a designated party such as the distributor's security office or, in some instances, directly to the police in the event of counterfeit medicine.

To truly authenticate a tag, the reader or designated party needs to know that the verification authority's reply or notification is genuine and has not been forged or altered. Said another way, the entity receiving the reply or notification needs to be able to verify that the reply or notification is from a trusted verification authority and was not forged by an illegitimate verification authority or altered during transmission.

In some applications, the reader may have a need to authenticate itself to a verification authority or a tag. For an example why, suppose the converse, that the verification authority accepted tag-authentication requests from any reader. A counterfeiter could then manufacture counterfeit tags and, prior to releasing the tags into the field, test them by configuring an illegitimate reader to send a counterfeit tag identifier, challenge and response to the verification authority and thereby ascertain whether the verification authority accepts the counterfeit tags. To prevent counterfeiters from this and other potential abuses, the verification authority may choose to require that the reader authenticate itself prior to responding.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generates signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the terms "electrically isolated" or "electrically decoupled" as used herein mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which may both harvest power and respond if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance. If IC 224 is capable of transmitting signals (e.g., has its own power source, is coupled to an external power source, and/or is able to harvest sufficient power to transmit signals), then IC 224 may respond by transmitting response signal 126.

In the embodiments of FIG. 2, antenna segments 226 and 228 are separate from IC 224. In other embodiments, the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

An RFID tag such as tag 220 is often attached to or associated with an individual item or the item packaging. An RFID tag may be fabricated and then attached to the item or packaging, or may be partly fabricated before attachment to the item or packaging and then completely fabricated upon attachment to the item or packaging. In some embodiments, the manufacturing process of the item or packaging may include the fabrication of an RFID tag. In these embodiments, the resulting RFID tag may be integrated into the item or packaging, and portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC. An "RFID IC" may refer to an item capable of receiving and responding to RFID signals. For example, an item having a separate but attached RFID tag can be considered an RFID IC, as is an item having an integrated RFID tag or an item manufactured to have the capabilities of an RFID tag. A standalone RFID tag may also be referred to as an "RFID IC".

The components of the RFID system of FIG. 1 may communicate with each other in any number of modes. One such mode is called full duplex, where both reader 110 and tag 120 can transmit at the same time. In some embodiments, RFID system 100 may be capable of full duplex communication if tag 120 is configured to transmit signals as described above. Another such mode, suitable for passive tags, is called half-duplex, and is described below.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R4T", and when tag 120 talks to reader 110 the communication session is designated as "T4R". Along the TIME axis, a sample R4T communication session occurs during a time interval 312, and a following sample T4R communication session occurs during a time interval 326. Interval 312 may typically be of a different duration than interval 326— here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, which may also be referred to as a backscatter time interval or backscatter interval, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126, for example by adjusting its antenna reflectance. Concurrently, according to block 386, reader 110 receives backscatter signal 126 and processes it.

Figure 4:
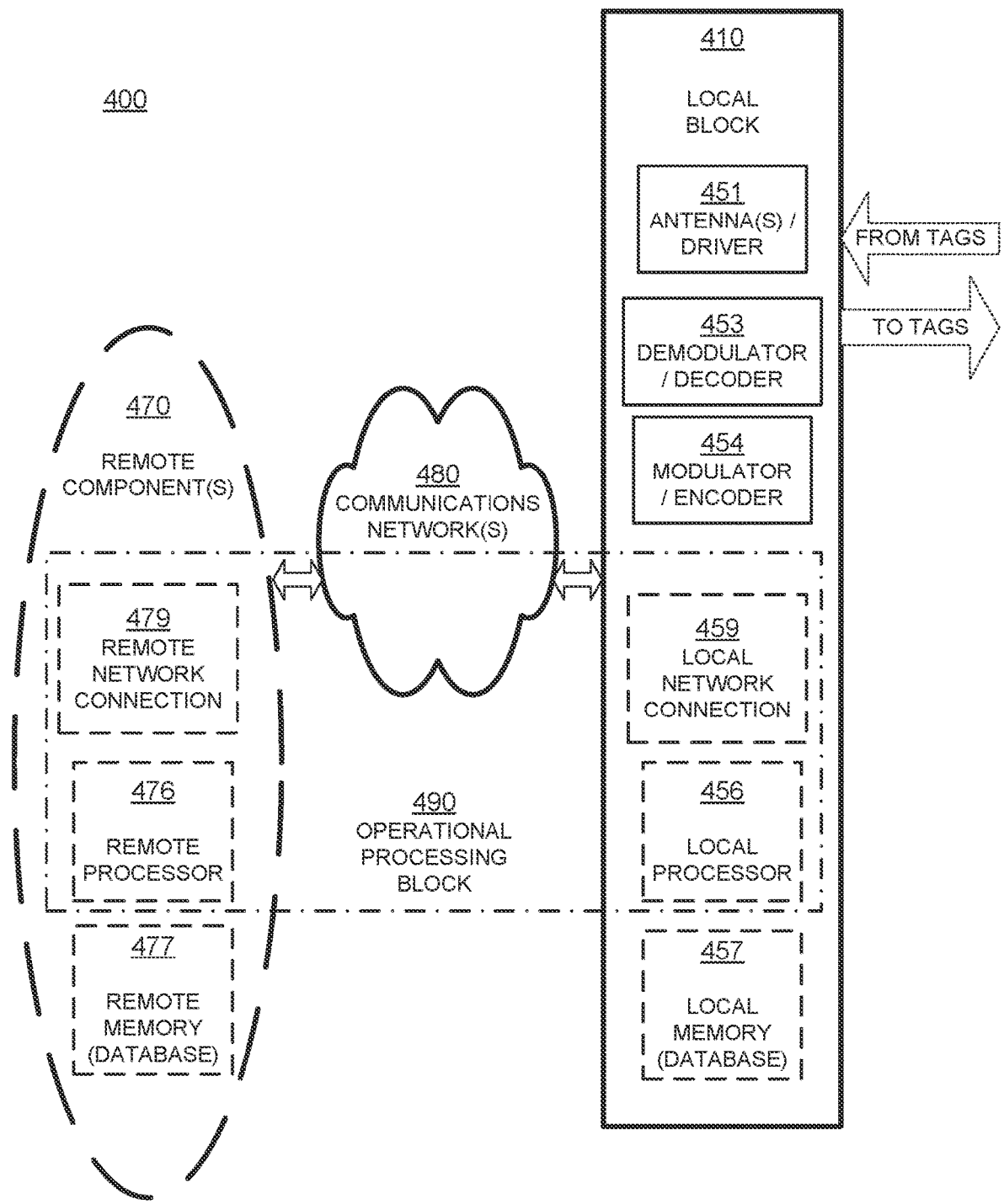
FIG. 4 is a block diagram showing a detail of an RFID reader system, such as the one shown in FIG. 1.

FIG. 4 is a block diagram of an RFID reader system 400 according to embodiments. RFID reader system 400 includes a local block 410, and optionally remote components 470. Local block 410 and remote components 470 can be implemented in any number of ways. For example, local block 410 or portions of local block 410 may be implemented as a standalone device or as a component in another device. In some embodiments, local block 410 or portions of local block 410 may be implemented as a mobile device, such as a handheld RFID reader, or as a component in a mobile device, such as a laptop, tablet, smartphone, wearable device, or any other suitable mobile device. It will be recognized that RFID reader 110 of FIG. 1 is the same as local block 410, if remote components 470 are not provided. Alternately, RFID reader 110 can be implemented instead by RFID reader system 400, of which only the local block 410 is shown in FIG. 1.

In some embodiments, one or more of the blocks or components of reader system 400 may be implemented as integrated circuits. For example, local block 410, one or more of the components of local block 410, and/or one or more of the remote component 470 may be implemented as integrated circuits using CMOS technology, BJT technology, MESFET technology, and/or any other suitable implementation technology.

Local block 410 is responsible for communicating with RFID tags. Local block 410 includes a block 451 of an antenna and a driver of the antenna for communicating with the tags. Some readers, like that shown in local block 410, contain a single antenna and driver. Some readers contain multiple antennas and drivers and a method to switch signals among them, including sometimes using different antennas for transmitting and for receiving. Some readers contain multiple antennas and drivers that can operate simultaneously. In some embodiments, block 451 may be a phased-array antenna or synthesized-beam antenna (SBA), and local block 410 may be implemented in a synthesized-beam reader (SBR) configured to generate one or more beams via the SBA. A demodulator/decoder block 453 demodulates and decodes backscattered waves received from the tags via antenna/driver block 451. Modulator/encoder block 454 encodes and modulates an RF wave that is to be transmitted to the tags via antenna/driver block 451.

Local block 410 additionally includes an optional local processor 456. Local processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by local processor 456. In some cases, local processor 456 may implement an encryption or authentication function; in some cases, one or more of these functions can be distributed among other blocks such as encoding block 454, or may be entirely incorporated in another block.

Local block 410 additionally includes an optional local memory 457. Local memory 457 may be implemented in any number of ways known in the art, including, by way of example and not of limitation, any of the memory types described above as well as any combination thereof. Local memory 457 can be implemented separately from local processor 456, or in an IC with local processor 456, with or without other components. Local memory 457, if provided, can store programs for local processor 456 to run, if needed.

In some embodiments, local memory 457 stores data read from tags, or data to be written to tags, such as Electronic Product Codes (EPCs), Tag Identifiers (TIDs) and other data. Local memory 457 can also include reference data that is to be compared to EPCs, instructions and/or rules for how to encode commands for the tags, modes for controlling antenna 451, encryption/authentication algorithms, algorithms for tracking tag location or movement, secret keys, key pairs, individual public and/or private keys, electronic signatures, and so on. In some of these embodiments, local memory 457 is provided as a database.

Some components of local block 410 typically treat the data as analog, such as the antenna/driver block 451. Other components such as local memory 457 typically treat the data as digital. At some point, there is a conversion between analog and digital. Based on where this conversion occurs, a reader may be characterized as "analog" or "digital", but most readers contain a mix of analog and digital functionality.

If remote components 470 are provided, they are coupled to local block 410 via an electronic communications network 480. Network 480 can be a Local Area Network (LAN), a Metropolitan Area Network (MAN), a Wide Area Network (WAN), a network of networks such as the internet, or a local communication link, such as a USB, PCI, and so on. Local block 410 may include a local network connection 459 for communicating with communications network 480 or may couple to a separate device or component configured to communicate with communications network 480. Communications on the network can be secure, such as if they are encrypted or physically protected, or insecure if they are not encrypted or otherwise protected.

There can be one or more remote component(s) 470. If more than one, they can be located at the same location, or in different locations. They may communicate with each other and local block 410 via communications network 480, or via other similar networks, and so on. Accordingly, remote component(s) 470 can use respective remote network connections. Only one such remote network connection 479 is shown, which is similar to local network connection 459, etc. In some embodiments, a single one of the remote component(s) 470 may be configured to communicate with and/or control multiple local blocks, each similar to local block 410.

Remote component(s) 470 can also include a remote processor 476. Remote processor 476 can be made in any way known in the art, such as was described with reference to local processor 456. Remote processor 476 may also implement an encryption/authentication function and/or a tag location/tracking function, similar to local processor 456.

Remote component(s) 470 can also include a remote memory 477. Remote memory 477 can be made in any way known in the art, such as was described with reference to local memory 457. Remote memory 477 may include a local database, and a different database of a standards organization, such as one that can reference EPCs. Remote memory 477 may also contain information associated with commands, tag profiles, keys, or the like, similar to local memory 457.

One or more of the above-described elements may be combined and designated as operational processing block 490. Operational processing block 490 includes those components that are provided of the following: local processor 456, remote processor 476, local network connection 459, remote network connection 479, and by extension an applicable portion of communications network 480 that links remote network connection 479 with local network connection 459. The portion can be dynamically changeable, etc. In addition, operational processing block 490 can receive and decode RF waves received via antenna/driver 451, and cause antenna/driver 451 to transmit RF waves according to what it has processed.

Operational processing block 490 includes either local processor 456, or remote processor 476, or both. If both are provided, remote processor 476 can be made such that it operates in a way complementary with that of local processor 456. In fact, the two can cooperate. It will be appreciated that operational processing block 490, as defined this way, is in communication with both local memory 457 and remote memory 477, if both are present.

Accordingly, operational processing block 490 is location independent, in that its functions can be implemented either by local processor 456, or by remote processor 476, or by a combination of both. Some of these functions are preferably implemented by local processor 456, and some by remote processor 476. Operational processing block 490 accesses local memory 457, or remote memory 477, or both for storing and/or retrieving data.

RFID reader system 400 operates by operational processing block 490 generating communications for RFID tags. These communications are ultimately transmitted by antenna/driver block 451, with modulator/encoder block 454 encoding and modulating the information on an RF wave. Then data is received from the tags via antenna/driver block 451, demodulated and decoded by demodulator/decoder block 453, and processed by operational processing block 490.

Embodiments of an RFID reader system can be implemented as hardware, software, firmware, or any combination. Such a system may be subdivided into components or modules. Some of these components or modules can be implemented as hardware, some as software, some as firmware, and some as a combination. An example of such a subdivision is now described, together with the RFID tag as an additional module.

Figure 5:
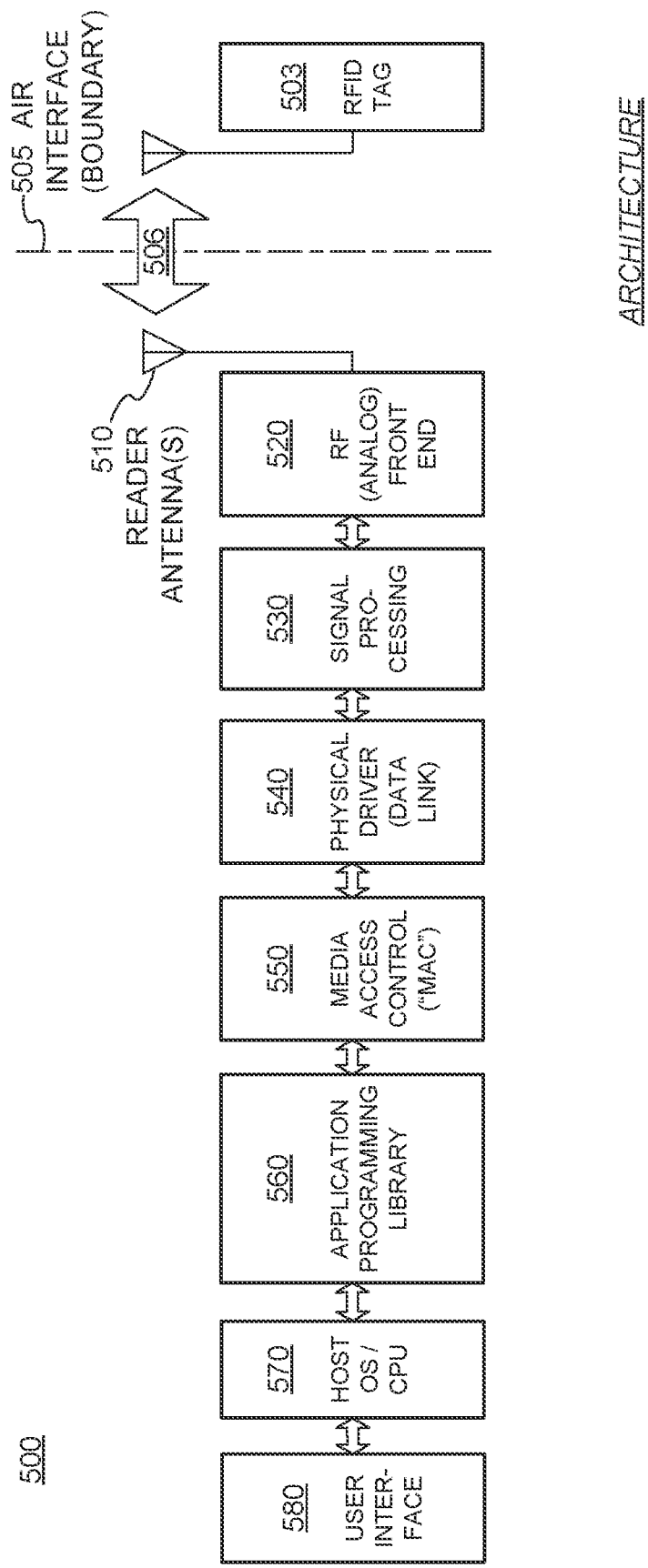
FIG. 5 is a block diagram illustrating an overall architecture of an RFID system according to embodiments.

FIG. 5 is a block diagram illustrating an overall architecture of an RFID system 500 according to embodiments. RFID system 500 may be subdivided into modules or components, each of which may be implemented by itself or in combination with others. In addition, some of them may be present more than once. Other embodiments may be equivalently subdivided into different modules. Some aspects of FIG. 5 are parallel with systems, modules, and components described previously.

An RFID tag 503 is considered here as a module by itself. RFID tag 503 conducts a wireless communication 506 with the remainder, via the air interface 505. Air interface 505 is really a boundary, in that signals or data that pass through it are not intended to be transformed from one thing to another. Specifications as to how readers and tags are to communicate with each other, for example the Gen2 Specification, also properly characterize that boundary as an interface.

RFID system 500 includes one or more reader antennas 510, and an RF front-end module 520 for interfacing with reader antenna(s) 510. These can be made as described above.

RFID system 500 also includes a signal-processing module 530. In one embodiment, signal-processing module 530 exchanges waveforms with RF front-end module 520, such as I and Q waveform pairs.

RFID system 500 further includes a physical-driver module 540, which is also known as a data-link module. In some embodiments, physical-driver module 540 exchanges bits with signal-processing module 530. Physical-driver module 540 can be the stage associated with the framing of data.

RFID system 500 additionally includes a media access control module 550. In one embodiment, media access control layer module 550 exchanges packets of bits with physical driver module 540. Media access control layer module 550 can make decisions for sharing the medium of wireless communication, which in this case is the air interface.

RFID system 500 moreover includes an application-programming library-module 560. This module 560 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 570. In some embodiments, the processor is not considered as a separate module, but one that includes some of the above-mentioned modules of RFID system 500. In some embodiments, the one or more processors may perform operations associated with retrieving data that may include a tag public key, an electronic signature, a tag identifier, an item identifier, and/or a signing-authority public key. In some embodiments, the one or more processors may verify an electronic signature, create a tag challenge, and/or verify a tag response.

User interface module 580 may be coupled to application-programming-library module 560, for accessing the APIs. User interface module 580 can be manual, automatic, or both. It can be supported by the host OS/CPU module 570 mentioned above, or by a separate processor, etc.

It will be observed that the modules of RFID system 500 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 510 receives wireless waves, which are in turn processed successively by the various modules in the chain. Processing can terminate in any one of the modules. In transmitting mode, waveform initiation can be in any one of the modules. Ultimately, signals are routed to reader antenna(s) 510 to be transmitted as wireless waves.

The architecture of RFID system 500 is presented for purposes of explanation, and not of limitation. Its particular, subdivision into modules need not be followed for creating embodiments. Furthermore, the features of the present disclosure can be performed either within a single one of the modules, or by a combination of them. In some embodiments RFID system 500 can be incorporated into another electronic device such as a checkout terminal in a store or a consumer device such as a mobile phone.

As mentioned previously, embodiments are directed to tags executing actions received from authenticated readers. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments further include storage media. Such media, individually or in combination with others, have stored thereon instructions, data, keys, signatures, and other data of a program made according to embodiments. A storage medium according to embodiments is a computer-readable medium, such as a memory, and is read by a processor of the type mentioned above. If the storage medium is a memory, it can be implemented in a number of ways, such as Read Only Memory (ROM), Random Access Memory (RAM), etc., some of which are volatile and some nonvolatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

Figure 6:
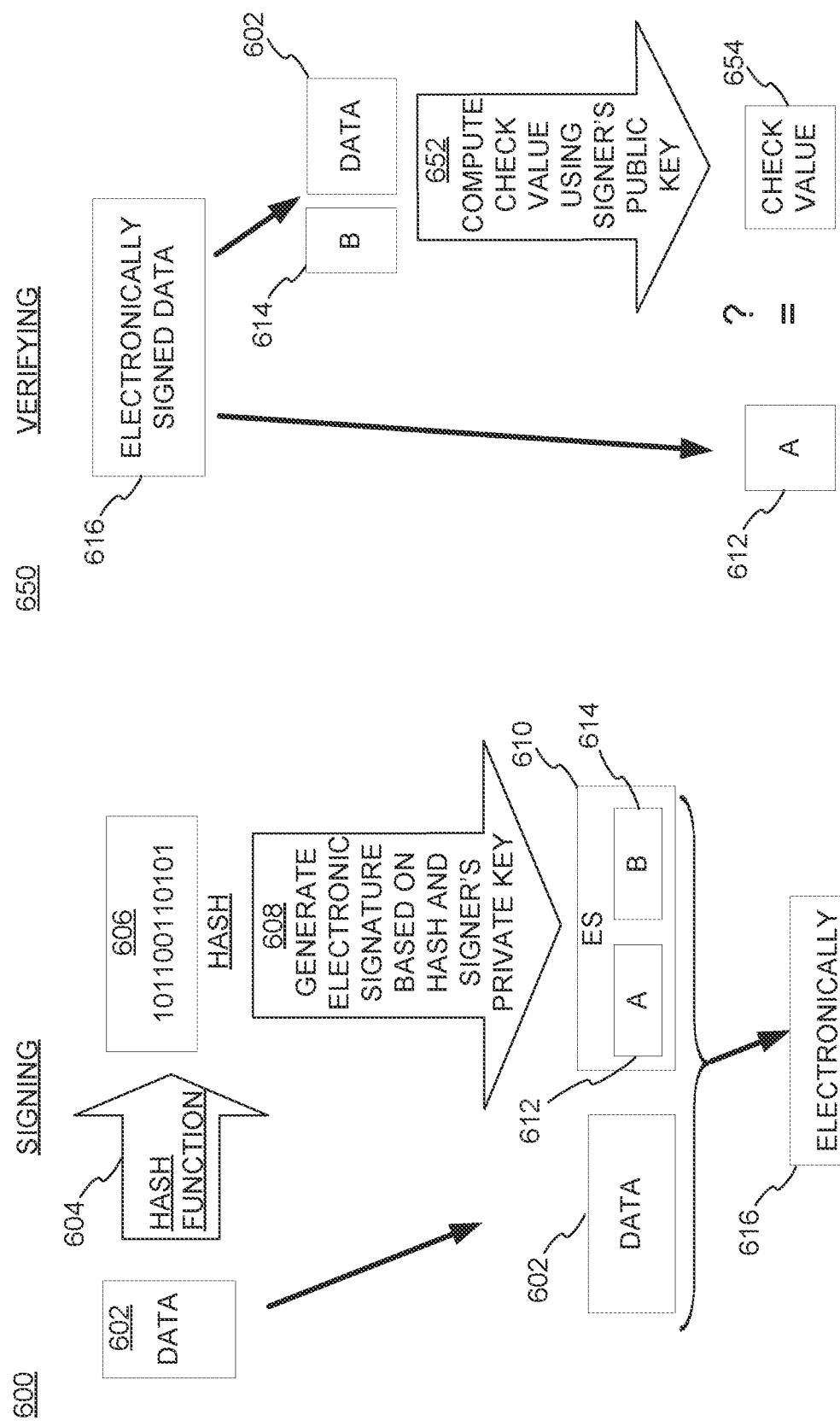
FIG. 6A is a flow diagram illustrating electronically signing data.
FIG. 6B is a flow diagram illustrating verifying electronically signed data.

FIGS. 6A and 6B are flow diagrams illustrating the creation and verification of an electronic signature (ES). Electronic signatures allow verification of the authenticity and integrity of an electronic message, including whether the message originated from a claimed sender and/or whether the message is original or has been altered.

Electronic signatures often employ asymmetric cryptography, in which case they are known as digital signatures. In asymmetric cryptography, a signatory, also referred to as a sender, possesses a private—public key pair where the private and public keys are mathematically related to each other. The sender uses the private key to generate the ES. A recipient uses the sender's public key to verify the ES. A verified ES provides the recipient with some confidence that the message was created by a known sender and that it was not altered in transit.

An important attribute of digital signatures is that they are difficult to forge. A number of standards have been developed for digital signatures. The Digital Signature Standard (DSS) is a U.S. government standard for digital signatures.

DSS is specified in Federal Information Processing Standards (FIPS) 186-1 and FIPS 186-3. FIPS 186-1 specifies two digital signature algorithms, the Digital Signature Algorithm (DSA) and the RSA digital signature algorithm. FIPS 186-3 includes a third digital signature algorithm, the Elliptic Curve Digital Signature Algorithm (ECDSA). FIPS 180-3, the Secure Hash Standard (SHS), specifies the hash functions to be used in conjunction with FIPS 186-1 and FIPS 186-3. The DSS, FIPS 186-1, FIPS 186-3, and FIPS 180-3 are hereby incorporated by reference in their entireties.

FIG. 6A is a flow diagram illustrating a method 600 for generating an ES. In method 600, a hash function 604 is first applied to data 602 to generate a hash value 606. An ES 610 is then generated (608) using the hash value 606 and the signer's private key (604). For example, the ES generation process may involve an ECDSA process, in which private and public ephemeral keys are computed and used to generate the ES 610. The ES 610 may include two signature components 612 and 614. In some embodiments, the two signature components 612 and 614 may correspond to r and s components of an ECDSA-generated ES. Subsequently, the ES 610 may be concatenated with the data 602 to create electronically-signed data 616.

FIG. 6B is a flow diagram illustrating a method 650 for verifying an ES, such as the ES 610 generated in FIG. 6A. In the method 650, data 602 and signature component 614 in the electronically-signed data 616 are used to compute (652) a check value 654 using the signer's public key. For example, the hash function 604 may be applied to the extracted data 602 to generate a hash value, which is then used along with the signer's public key and the signature component 614 to compute the check value 654. Subsequently, the computed check value 654 is compared to the signature component 612 in the electronically-signed data 616. If the values match, then the ES is considered verified or proper. A verified ES provides assurance that the data 602 was signed by the known sender and that the data has not been altered. On the other hand, if the values do not match, then the electronically-signed data 616 may have been tampered with and/or altered.

While electronic signatures above are described in the context of asymmetric cryptography, in some embodiments electronic signatures may instead employ symmetric cryptography, in which case they may be known as "message authentication codes" or MACs. When using symmetric cryptography, a signer may use a secret key to generate a MAC based on data (e.g., data 602) and/or a hash value derived from the data (e.g., hash value 606). The MAC and the data together may then constitute electronically-signed data (e.g., electronically-signed data 616). A recipient of the electronically-signed data who also knows the secret key may then either (a) use the MAC to generate check data and compare the check data with the original data or (b) use the original data to generate a check MAC and compare the check MAC with the original MAC. Based on the comparison, the recipient can determine if the data originated from an entity in possession of the secret key and/or was tampered with during transit.

Figure 7:
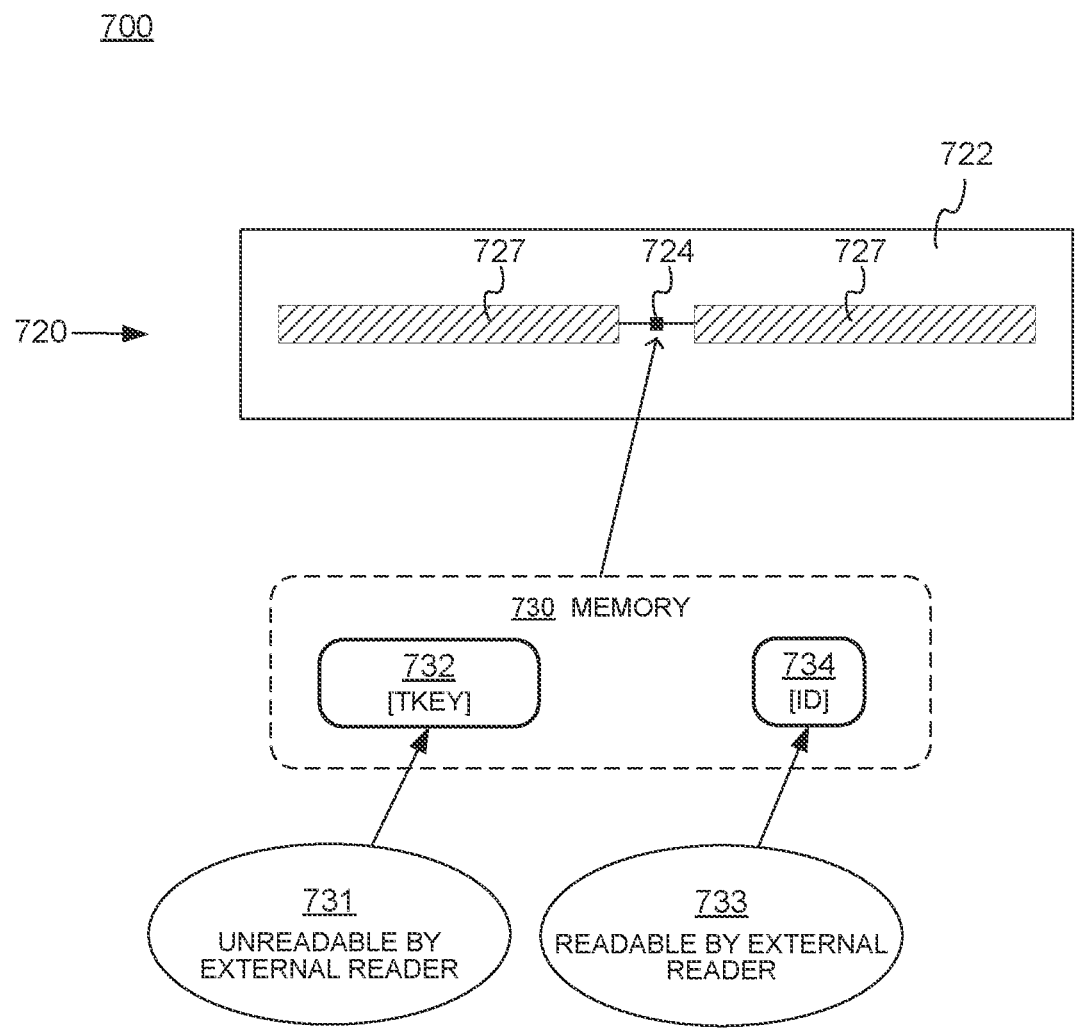
FIG. 7 illustrates an RFID tag and how an identifier and a key may be stored in the tag according to embodiments.

FIG. 7 illustrates a tag 720 configured to store a tag key 732 and an identifier (ID) 734 according to embodiments. Tag 720, similar to tag 220 depicted in FIG. 2, includes an IC 724 (similar to IC 224 in FIG. 2) with a tag memory 730 configured to store the tag key 732 and the ID 734. The tag key TKEY 732, which is used to encrypt or decrypt messages sent from or received by the tag 720, is stored in a portion 731 of the tag memory 730 that is not readable by an external device such as a reader. TKEY 732 may be a private key (for asymmetric cryptography) or a secret key (for symmetric cryptography).

In contrast, the ID 734, which may identify the tag, an item to which the tag is attached, or both, is stored in a portion 733 of the tag memory 730 that is readable by an external device. For example, the ID 734 may include a tag identifier (TID), a key identifier (KID), a unique item identifier (UII), an electronic product code (EPC), a serialized trade identification number (SGTIN), or any other suitable identifier or identification code. The tag memory 730 may also be configured to store any other suitable data.

Figure 8:
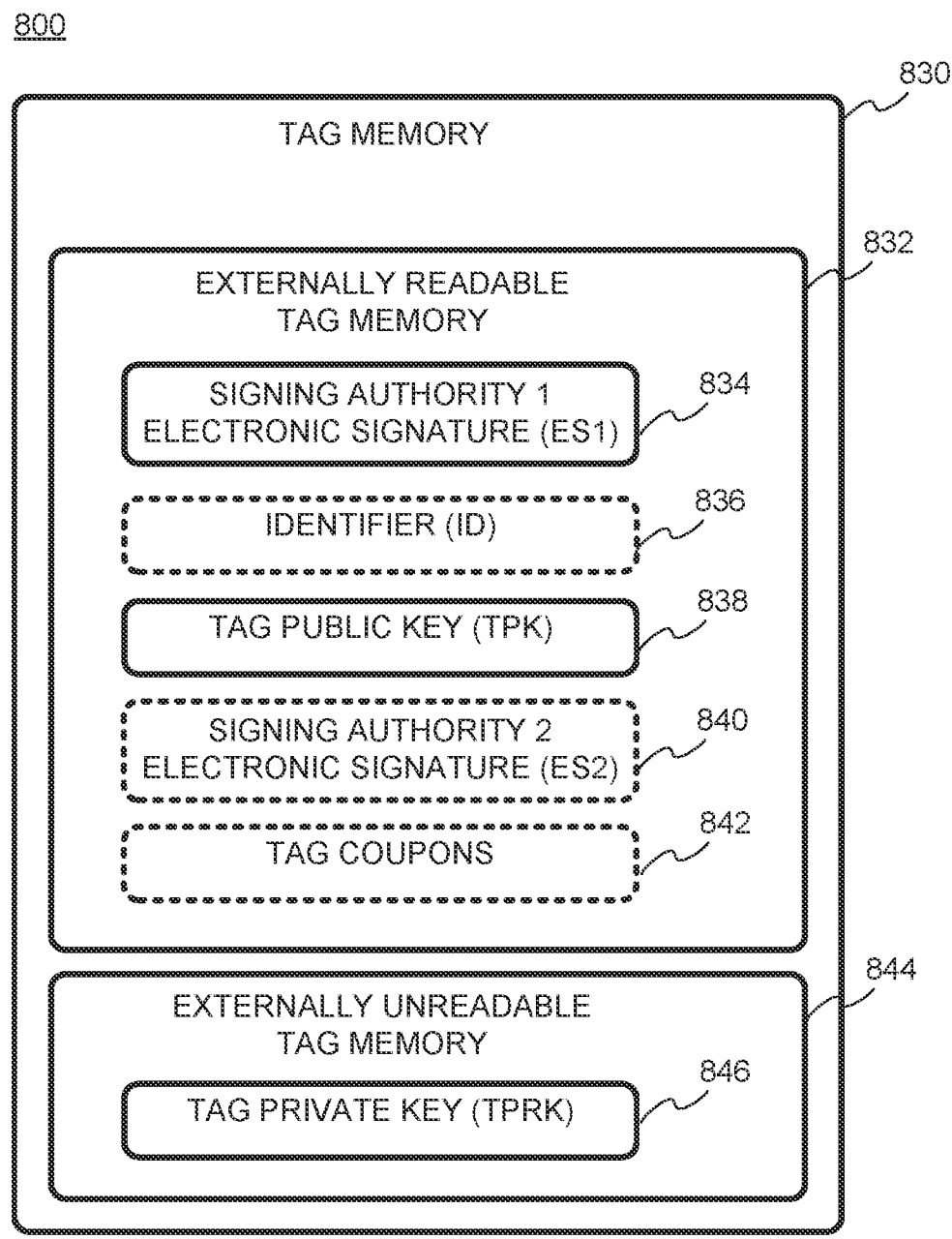
FIG. 8 illustrates a tag IC memory configuration according to one embodiment.

FIG. 8 illustrates a tag memory configuration 800 of a tag memory 830 according to embodiments. The tag memory 830, which like tag memory 730 above may be part of a tag integrated circuit (IC), includes a memory portion 832 that is readable by an external device (e.g., a reader) and a memory portion 844 that is not readable by an external device. Various types of data may be stored in the memory portions 832 and 844, depending on the nature of the data. For example, a tag manufacturer or other legitimate entity may generate a tag key pair having a tag private key (TPRK) 846 and a tag public key (TPK) 838 and store these keys in tag memory. The TPRK 846, which is only known to the tag, is stored in the unreadable memory portion 844. The TPK 838, which is publicly accessible, may be stored in the readable memory portion 832. An external party can then use the publicly accessible TPK 838 to encrypt or sign a message to the tag, which can then use its TPRK 846 to decrypt or verify the message. Similarly, the tag can use its TPRK 846 to encrypt or sign a message to an external party, which then uses the publicly accessible TPK 838 to decrypt or verify the message.

In some embodiments, the externally-readable memory portion 832 includes an optional identifier (ID) 836, similar to ID 734. The ID 836 identifies the tag and/or an item to which the tag is attached, and may include a tag identifier (TID), an item identifier such as an EPC code (EPC) or a unique item identifier (UII), or some other number such as a serialized global trade identification number (SGTIN).

The externally-readable memory portion 832 also includes a signing authority electronic signature (ES1) 834. A signing authority (e.g., the tag manufacturer, the item manufacturer, or a trusted third party) may generate the ES1 834 using a signing authority private key and use the ES1 834 to electronically sign the TPK 838 and/or the ID 836, as described above in relation to FIGS. 6A-B. The ES1 834, in combination with a signing authority public key, can then be used to verify the authenticity of the TPK 838 and/or the ID 836. In some embodiments, the memory portion 832 also includes another ES2 840, which may be generated using the private key of a different signing authority. ES1 834 and ES2 840 may both sign the same data (e.g., both sign the TPK 838 and/or the ID 836), each sign a different piece of data (e.g., ES1 834 signs the TPK 838 and ES2 840 signs the ID 836, or vice-versa), or may overlap in their signatures (e.g., ES1 834 signs the TPK 838 and ES2 840 signs both the TPK 838 and the ID 836). One advantage of having electronic signatures from different signing authorities is that a particular reader only needs to have access to one of the signing entity public keys in order to authenticate the signed data. In certain embodiments, an ES signs another ES. For example, if ES1 834 signs the TPK 838 and/or the ID 836, ES2 840 may then sign the ES1 834 and the TPK 838/ID 836.

The tag memory 830 may also store one or more optional tag coupons 842 (also known as commitments). A tag coupon (or commitment) represents a pre-computed cryptographic value, and may either be the actual cryptographic value, an indicator that corresponds to but is not the actual cryptographic value, or be derived using the cryptographic value as a coupon precursor. Because a tag coupon represents a pre-computed value, it can be used to facilitate an asymmetric cryptographic transaction between the tag and another entity (e.g., a reader) by reducing the computation performed by the tag. For security reasons, a particular tag coupon is typically discarded after a single cryptographic transaction. Therefore, a coupon-enabled tag that is configured for multiple transactions may store (or have access to) a number of tag coupons, each of which is unique for at least the tag. In some embodiments, tag coupons 842 are stored in the readable memory portion 832. During a transaction, the other party (e.g., a reader) reads a selected tag coupon from the coupons 842 stored in the memory portion 832. In other embodiments, tag coupons are stored in the unreadable memory portion 844, and when a coupon is required for a transaction, the tag retrieves a selected tag coupon 842 from the memory portion 844 and stores it in the readable memory portion 832 for the other party to read.

In some embodiments, a tag may use a counter value in a tag coupon counter to keep track of its tag coupons. The tag may use the counter value to determine which tag coupons have been used, or may also generate tag coupons based on the counter value using, for example, a pseudo-random number generator seeded based on a tag coupon counter value. The tag then either stores the generated tag coupon or the tag coupon counter value in the readable memory portion 832 for the other party to read. In the latter case, the other party then is able to generate the tag coupon using the tag coupon counter value.

After data is stored on the tag IC memory portions 832 and 844, the memory portions 832 and 844 may be configured so as to be unwriteable by external devices. This can be done to prevent a counterfeiter or attacker from rewriting sensitive data (e.g., TPK, TPRK, electronic signatures, coupons, etc.) onto the tag IC memory. However, in some circumstances it is possible for an external device to erase and/or rewrite data on memory portions 832 and 844. For example, a tag manufacturer may wish to re-commission (see FIG. 9, below) a particular tag by providing new keys and/or coupons in order to reuse the tag or if it is determined that the tag has been compromised.

Counterfeiters can clone tag ICs that do not have a hidden key or other hidden secret by simply copying the tag IC memory contents. Counterfeiters cannot easily clone tags IC built according to embodiments because the ICs contain an unreadable TPRK and use coupons and challenge-response methods for authentication.

Embodiments also provide a means for a reader to authenticate a tag without needing to know a unique password or key for each tag. The tag exposes its TPK, protected by an ES, to the reader. The reader uses the signing authority's public key and the ES to verify the TPK. The reader then uses the verified TPK and a challenge-response dialog to authenticate the tag, as described below.

Embodiments can be used for items and applications requiring counterfeit detection, where genuine items have authentic tags but non-genuine items do not have authentic tags and can be discovered, traced, and removed. Embodiments render counterfeiting or cloning a tag difficult by providing each authentic tag with a (ideally) unique private-public key pair and allowing a reader to verify the tag's authenticity without needing to store a unique public key for every tag and without needing to access a network every time it wants to verify a tag. Example applications include retail, food safety, pharmaceutical, document protection, and the currency industries.

Figure 9:
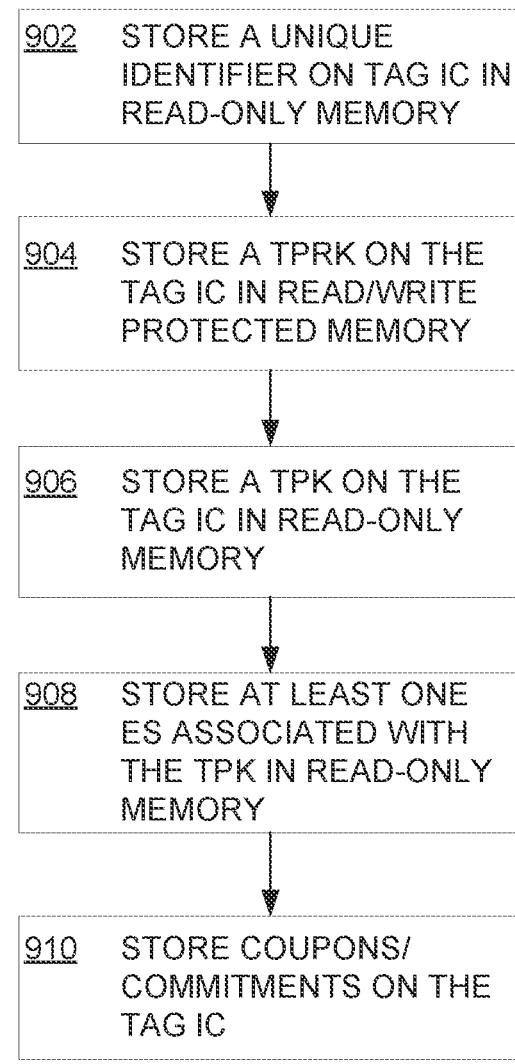
FIG. 9 is a flowchart illustrating an RFID tag IC commissioning process according to an embodiment.

An RFID tag IC may be commissioned before it is deployed. FIG. 9 is a flowchart illustrating an RFID tag IC commissioning process 900 according to an embodiment. The commissioning process 900 begins with step 902, in which a unique identifier (e.g., ID 836 in FIG. 8) is stored on the tag IC in read-only memory (e.g., memory portion 832 in FIG. 8). In step 904, a tag private key (e.g., TPRK 846 in FIG. 8) is stored in read/write-protected memory (e.g., memory portion 844 in FIG. 8), and in step 906 a corresponding tag public key (e.g., TPK 838 in FIG. 8) is stored in read-only memory (e.g., memory portion 832 in FIG. 8). In step 908, an electronic signature (e.g., ES1 834) associated with the stored tag public key is then generated and stored in read-only memory such as memory portion 832 in FIG. 8. In some embodiments, one or more other electronic signatures (e.g., ES2 840 in FIG. 8) associated with the stored tag public key, an identifier, and/or one or more other electronic signatures may also be generated and stored in tag memory. Finally, in step 910, one or more tag coupons are stored on the tag IC. Tag coupons may be stored in externally-readable memory, such as memory portion 832 in FIG. 8, or may be stored in externally-unreadable memory, such as memory portion 844 in FIG. 8. However, if tag coupons are generated by the tag as described above in relation to FIG. 8, the tag coupons may not be stored on the tag during the commissioning process.

In some embodiments, multiple electronic signatures can be combined into a single electronic signature block. During the combination process, redundant signature components can be removed, resulting in the final signature block occupying less memory than all of the individual electronic signatures.

Figure 10:
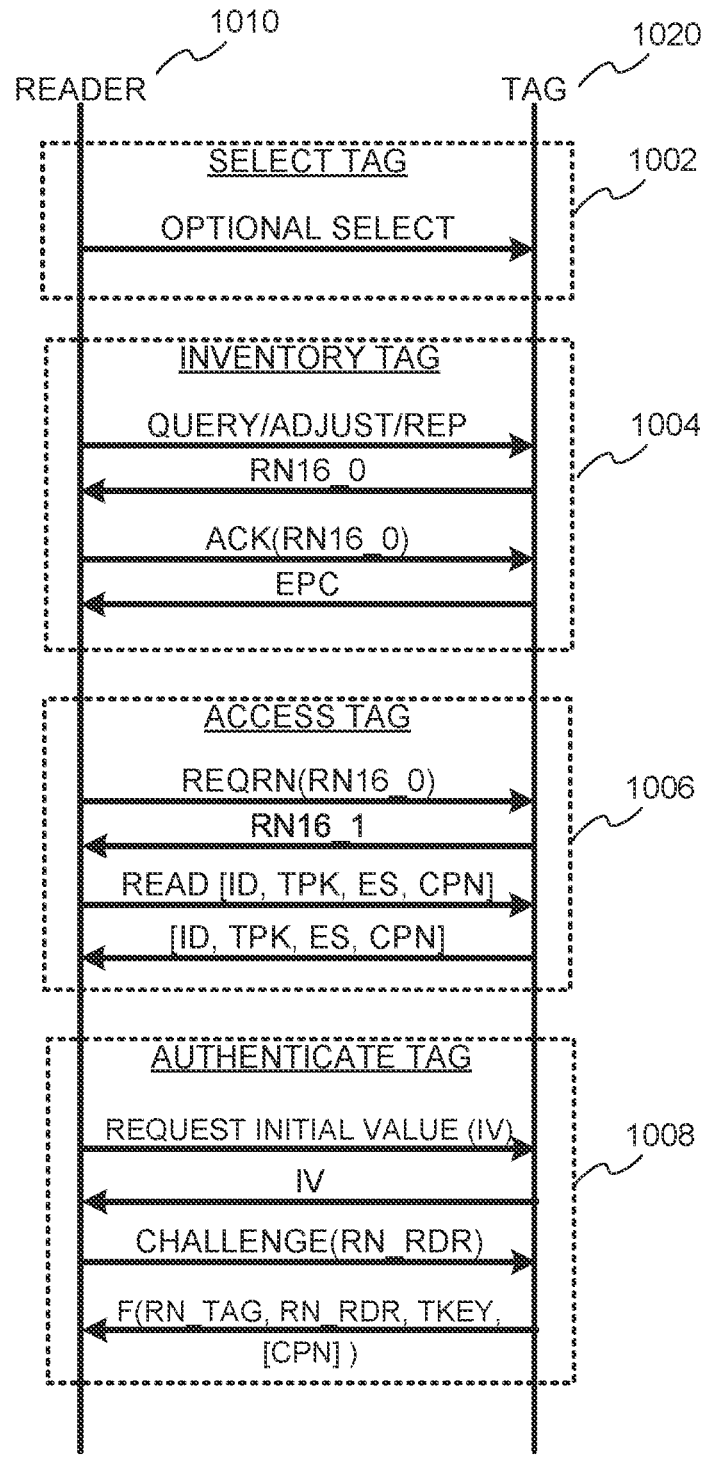
FIG. 10 illustrates exchanges between a reader and a tag according to embodiments.

FIG. 10 illustrates command—response exchanges between a reader and a tag according to embodiments. Although the commands and responses in diagram 1000 of FIG. 10 assume that the reader and tag are using the Gen2 Specification for their communications protocol, the present invention does not require using the Gen2 Specification, and other communications protocols and command sequences are possible. Additionally, even when using the Gen2 Specification the particular order of operations need not follow that shown in FIG. 10. Other orderings are possible; exchanges can be merged, enhanced, or eliminated; and the authentication can be spread across various operations between reader and tag.

The interactions between reader 1010 and tag 1020 in diagram 1000 begin with an optional tag selection 1002, in which the reader sends a select command to multiple tags in a tag population in order to select one or more tags from the tag population for subsequent inventory and authentication. This optional selection is followed by an inventory 1004, where the reader singulates a tag and receives an identifier from the tag. The shown inventory uses the Query-ACK sequence described in the Gen2 Specification. Inventory is followed by access 1006, where the reader accesses the tag and optionally reads the tag's TPK, ID, ES, and a selected tag coupon (or a random number based on the selected tag coupon). Finally, access is followed by authentication 1008, where the reader authenticates the tag using a challenge-response dialog as described herein.

As described above, embodiments include different orderings of interactions between reader and tag. For example, in some embodiments the reader sends a challenge during tag selection 1002, preceding the access 1006, and the tag computes its response and stores the response in memory for subsequent reading by a reader. The tag's computation may also include a tag random number and/or a tag coupon, and this random number/tag coupon may be stored for subsequent access by the reader. Indeed, in embodiments where the challenge occurs during tag selection, and reading the response occurs during tag access, authentication 1008 need not exist, because its operations have been spread among select 1002 and access 1006. One reason a reader may choose to send the challenge with select 1002 is for multiple tags to hear the challenge and compute their cryptographic responses in parallel. Because cryptographic computations can be time intensive, enabling multiple tags to compute their responses in parallel allows more rapid authentication of a population of tags. In some embodiments, the challenge itself may be sent to multiple tags simultaneously, separately from select 1002.

Authentication 1008 can include many options, depending on the chosen cryptographic algorithm. For example, the reader may first request a tag random number from the tag. The tag may generate a tag random number, calculate an initial value (IV) from the tag random number and a tag key TKEY (which may be a secret key or a private key), and sends the IV to the reader. The reader then sends a challenge including a reader-generated random number to the tag. The tag computes its response to the challenge based on the TKEY, the tag random number, the reader challenge, and a selected tag coupon, and sends the response to the reader. At this point the reader can verify the tag's response using the IV, the reader random number, the coupon, and the TPK. Of course, some challenge-response variants do not use a tag random number, an IV, or tag coupon; others may include a command count or a message-authentication code; others may include the reader encrypting the random number in the reader challenge; and yet others may include fewer or more steps than shown.

In some embodiments, a reader retrieves a tag's TPK, ES, and coupon, obtains the signing authority's master public key via a network or other means, verifies the TPK, challenges the tag with a random number, receives the tag's response, and verifies the response using the TPK and the coupon. In some embodiments, the reader also receives an ID from the tag, and may use the ID to identify a signing authority or a particular master key. In some embodiments, the challenge includes the reader encrypting a random number (RN) using the TPK, sending the encrypted RN to the tag, receive a decrypted RN from tag, and verifying by comparing the RN before encryption with the received, decrypted RN. In other embodiments, the challenge includes the reader sending an RN to the tag, receiving an encrypted RN from tag, decrypting the received RN using the TPK, and verifying by comparing the sent RN with the decrypted, received RN. In yet other embodiments, the reader may send a tag response to a challenge to a network-connected verification authority for verification, without needing to use the tag TPK or coupon.

Figure 11:
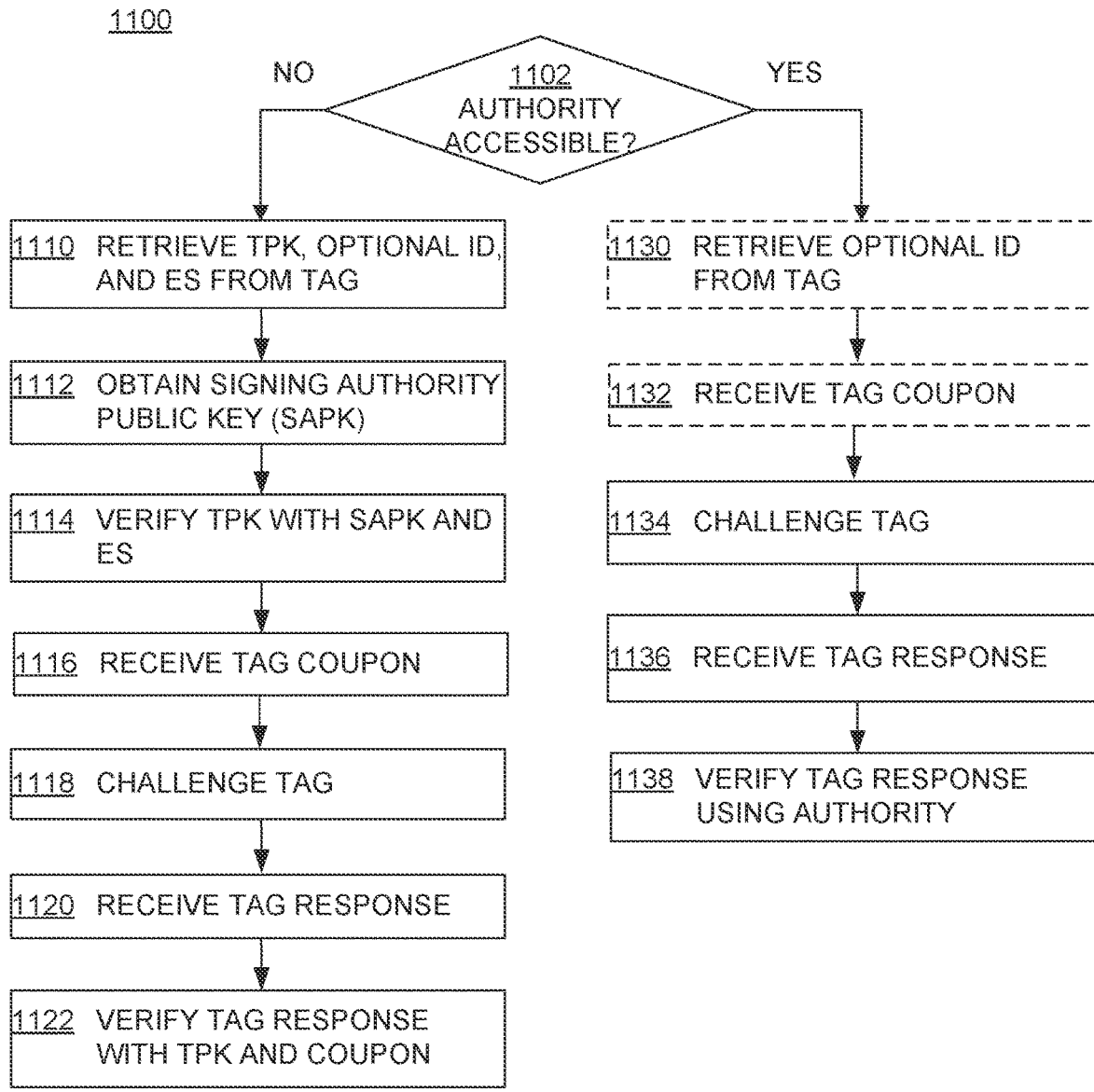
FIG. 11 is a flowchart illustrating a process for a reader authenticating a tag according to embodiments.

FIG. 11 is a flowchart illustrating a process 1100 for a reader authenticating a tag according to embodiments. Process 1100 begins with operation 1102, where the reader determines if it can access a verification authority through a network connection. If not, the reader retrieves at least a TPK and an ES from a tag in operation 1110. Optionally, the reader also retrieves an ID which may be a tag identifier, an item identifier, or both. At operation 1112 the reader obtains a signing-authority public key (SAPK), also known as a master public key, from a signing authority. In some embodiments, the reader may use the retrieved ID to help identify the proper signing authority, or to help identify which SAPK to use from a given signing authority. In some embodiments, the reader retrieves the SAPK indirectly, via a $3^{rd}$ party. In other embodiments, the SAPK is stored at the reader, and the reader accesses the stored SAPK instead of having to retrieve it from the signing authority. The reader verifies the TPK using the SAPK and ES at operation 1114. At operation 1116, the reader receives a tag coupon from the tag. For example, the tag may send the actual tag coupon to the reader, or may instead send a number associated with or generated from the coupon (e.g., a tag coupon counter value). At operation 1118 the reader challenges the tag. In some embodiments, the reader challenges the tag by sending a Challenge or Authenticate command, both of which are described in the Gen2 Specification. According to some embodiments the reader challenge includes a random number. At operation 1120 the reader receives a tag response to the challenge. At operation 1122 the reader verifies the tag response using the TPK and the tag coupon. If the verification is successful then the tag is presumed genuine.

On the other hand, if at operation 1102 the reader determines that a verification authority is accessible, the reader may proceed to verify the tag without using the TPK or any tag coupons. The reader may first retrieve a tag ID at optional operation 1130, similar to operation 1110, and may also receive a tag coupon at optional operation 1132, similar to operation 1116. The reader then challenges the tag at operation 1134 and receives a tag response at operation 1136, similar to operations 1118 and 1120 above. In some embodiments, the reader may notify the tag, or the tag itself may determine, that the tag response should not be computed using a tag coupon. Finally, at operation 1138 the reader may use the accessible verification authority to verify the received tag response, instead of verifying the tag response using a tag TPK and coupon.

In some embodiments, the operations in process 1100 may be combined, or may take place in different orders. For example, the reader may receive the tag coupon along with the TPK, optional ID, and/or ES. As another example, the reader may send the tag challenge before operations 1110, 1112, 1114, 1116, 1130, and/or 1132. As yet another example, the SAPK retrieval in operation 1112 may occur before operation 1110 or after the tag coupon and/or the tag response is received, and the TPK verification in operation 1114 may occur after the tag coupon and/or the tag response is received.

Figure 12:
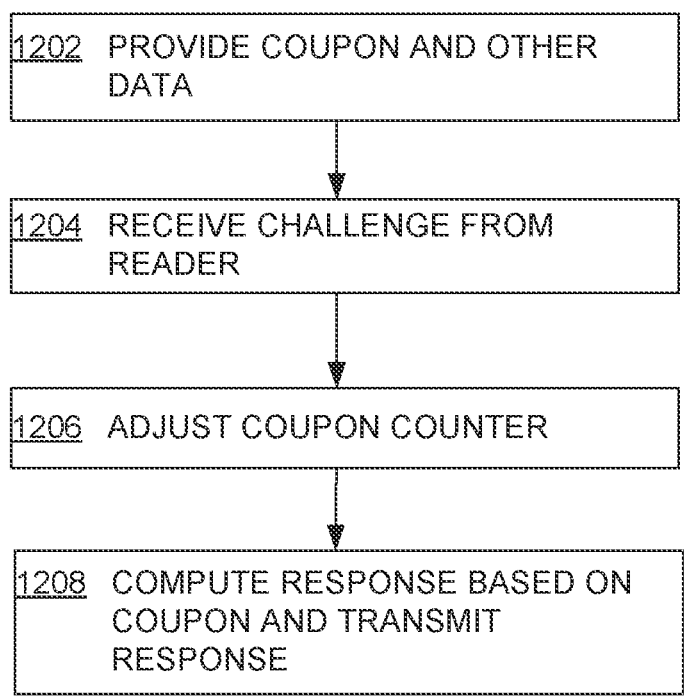
FIG. 12 is a flowchart illustrating a tag coupon-based response process according to embodiments.

For coupon-based authentication schemes, it is preferable to assure that a particular selected coupon on a tag is only used once. One method to accomplish this is to associate each coupon on a tag with a particular value of a tag coupon counter, and then to increment or decrement the counter as each coupon is used. FIG. 12 is a flowchart illustrating a tag coupon-based response process 1200 according to embodiments. Process 1200 begins with operation 1202, in which an RFID tag first provides a selected coupon and optionally other data. In some embodiments, the coupon is selected based on the value of the tag coupon counter. Operation 1202 may correspond with operations 1116 or 1132 in FIG. 11, where a reader receives the selected coupon from the tag. As described above, the RFID tag may also provide other data such as its TPK, identifier, and/or ES along with a selected coupon. The RFID tag subsequently receives a challenge from the reader in operation 1204. As described above, in some embodiments the challenge includes a Challenge or an Authenticate command as described in the Gen2 Specification. Upon receiving the challenge and determining that the coupon provided in operation 1202 is to be used in computing its response, the tag may then adjust the tag coupon counter in operation 1206 to indicate that the selected coupon (associated with the old counter value) has been used. The tag may adjust the tag coupon counter by incrementing or decrementing the tag coupon counter value. Finally, in operation 1208, the tag computes a response based on the selected coupon and the received challenge and sends the response to the reader. In other embodiments, the tag may adjust the tag coupon counter after the response has been computed or sent to the reader.

Figure 13:
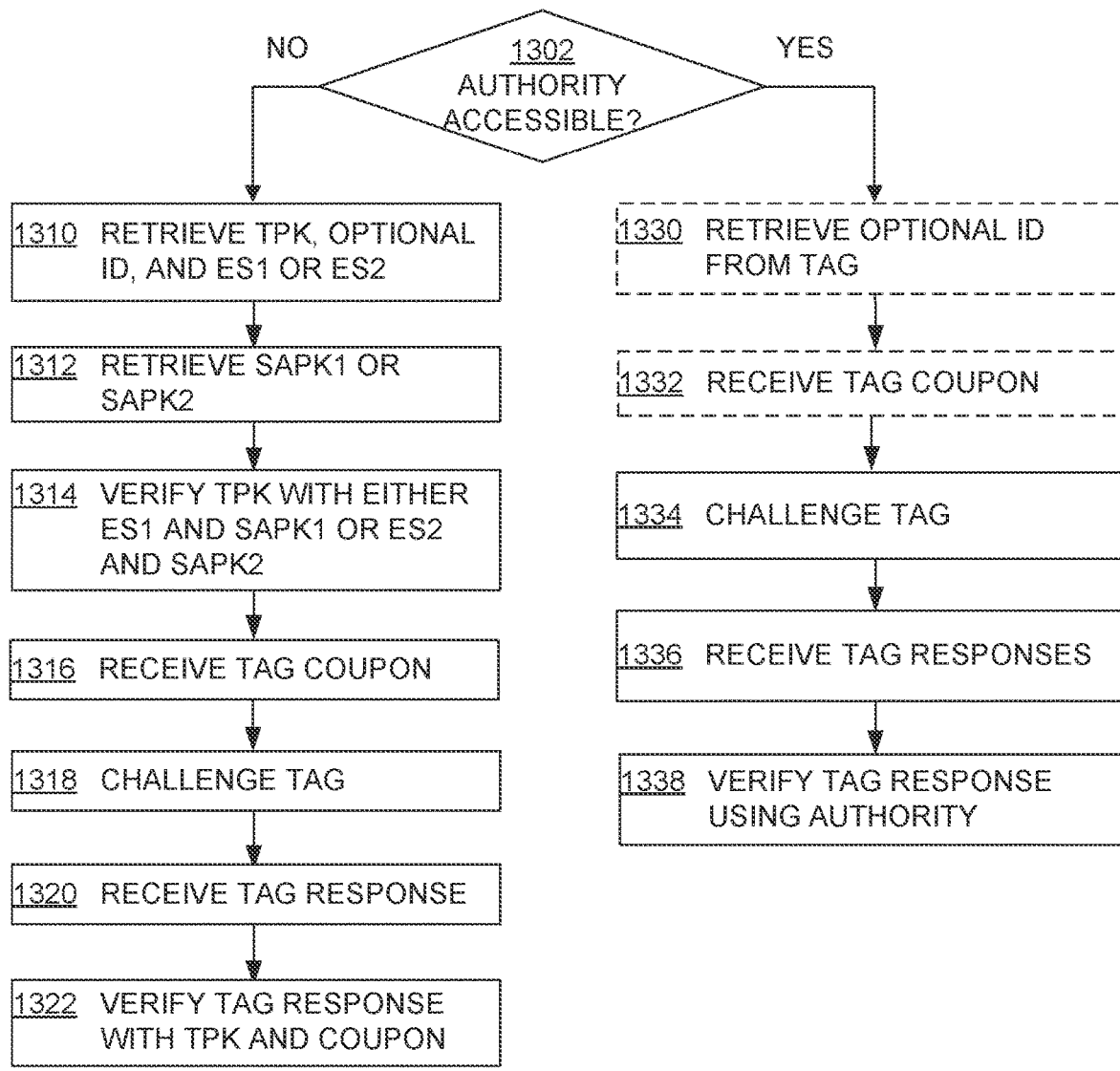
FIG. 13 is a flowchart illustrating a process for a reader authenticating a tag according to other embodiments.

FIG. 13 is a flowchart illustrating a process 1300 for a reader authenticating a tag according to embodiments. Process 1300 begins with operation 1302, where the reader determines if a verification authority it accessible via, for example, a network connection. If not, in operation 1310 the reader retrieves at least a TPK and an ES from a tag. In the embodiment shown the tag contains an ES1 and an ES2, corresponding to a first signing authority and a second signing authority, and the reader retrieves one of ES1 and ES2. Optionally, the reader may retrieve both ES1 and ES2, and may also retrieve one or more of a tag identifier, item identifier, or another type of identifier. At operation 1312 the reader retrieves, from a signing authority (i.e. the first signing authority and/or the second signing authority), a SAPK that corresponds to the retrieved ES. In some embodiments, the reader may use the ID to help identify the proper signing authority, or may use the ID to help identify which SAPK to use from a given signing authority. The reader may also store the SAPKs locally, as described above in relation to FIG. 11, instead of having to retrieve the SAPKs from the signing authorities. In operation 1314 the reader verifies the TPK using the appropriate SAPK and ES. At operation 1316 the reader may receive a tag coupon from the tag, similar to operation 1116 described above. At operation 1318 the reader challenges the tag. In some embodiments, the reader challenges the tag by sending a Challenge or Authenticate command, both of which are described in the Gen2 Specification. According to some embodiments the reader challenge includes a random number. At operation 1320 the reader receives a tag response to the challenge. At operation 1322 the reader verifies the tag response using the TPK and the tag coupon. If the verification is successful then the tag is presumed genuine.

On the other hand, if at operation 1302 the reader determines that a verification authority is accessible, the reader may proceed to verify the tag without using the TPK or any tag coupons. The reader may first retrieve a tag ID at optional operation 1330, similar to operation 1310, and may also receive a tag coupon at optional operation 1332, similar to operation 1316. The reader then challenges the tag at operation 1334 and receives a tag response at operation 1336, similar to operations 1318 and 1320. In some embodiments, the reader may notify the tag, or the tag itself may determine, that the tag response should not be computed using a tag coupon. Finally, at operation 1338 the reader may use the accessible verification authority to verify the received tag response, instead of verifying the tag response using a tag TPK and coupon.

As mentioned above, the reader may interact with a verification authority that has some knowledge of the interrogated tag(s) (e.g., the tag key TKEY for one or more tags and/or the encryption algorithm(s) used by one or more tags). The verification authority may be known to the reader a priori, or the reader may query a network for the identity of an appropriate verification authority. In some embodiments, a tag may store the identity of a verification authority suitable for verification, and the reader may read the verification authority information from the tag. For example, referring to FIG. 10, after the reader has received a tag response in the authentication step 1008, the reader may send the tag response, the tag IV (if any), the original reader challenge, and the tag ID (received in access 1006) to the verification authority. The verification authority may then determine the tag key TKEY and/or the particular encryption algorithm used by that tag (e.g., by looking it up based on the received tag ID) and use the determined TKEY/encryption algorithm, along with the original reader challenge and tag IV (if any), to decrypt or verify the tag response. If the verification authority is able to decrypt/verify the tag response based on its knowledge of the tag (e.g., TKEY/encryption algorithm), then the verification authority confirms the tag response and thereby corroborates the tag's (or attached item's) authenticity.

In some embodiments, the verification authority may generate the challenge and send it to the reader for transmission to the tag. In this case, the reader may not transmit the original reader challenge back to the verification authority along with the tag response, tag IV, and the tag ID, because the verification authority already knows the challenge used. Optionally, the verification authority may generate and provide a random number (e.g., the reader random number or an entirely different random number) for the reader to use to generate the challenge.

Figure 14:
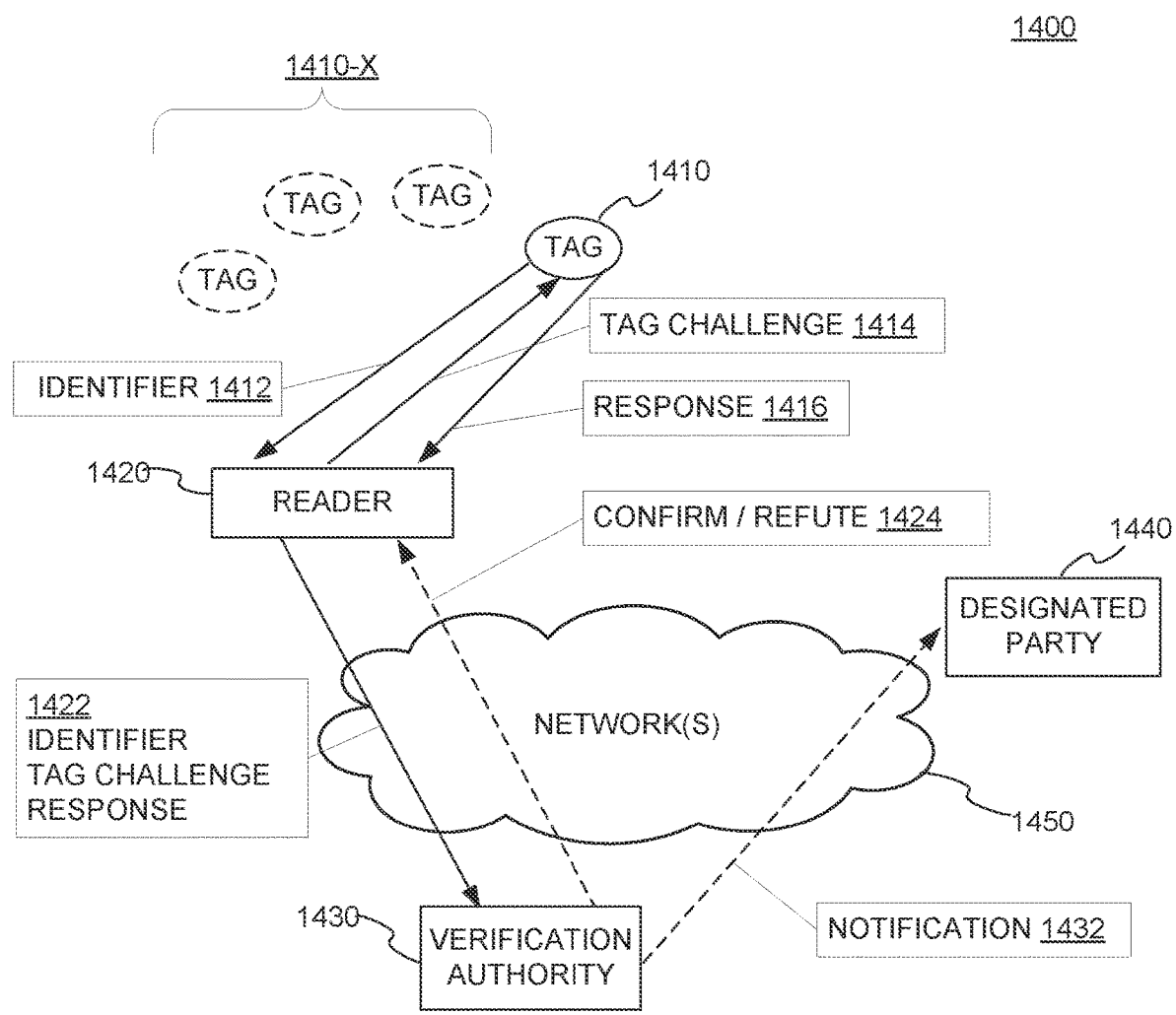
FIG. 14 is a diagram depicting interactions between an RFID reader, RFID tags, a verification authority, and a designated party according to embodiments.

FIG. 14 is a diagram 1400 depicting interactions between an RFID reader 1420, RFID tags 1410-X and 1410, a verification authority 1430, and a designated party 1440 according to one embodiment. In diagram 1400, reader 1420 is in the process of communicating with a number of tags 1410-X and 1410. In particular, reader 1420 has singulated tag 1410, and receives an identifier 1412 (e.g., an EPC or other identifier such as ID 734/836 in FIGS. 7/8) from the tag 1410, for example in response to an initial command. The reader 1420 then transmits a tag challenge 1414 (e.g., the challenge in authentication step 1008, FIG. 10) to the tag 1410. The tag 1410, which stores a secret (e.g., a tag key, such as TKEY 732 or TPRK 846 in FIG. 7/8), generates a response 1416 (e.g., the F( )response in authentication step 1008, FIG. 10) based on the stored secret and the tag challenge 1414 (and optionally tag-generated randomness). The tag 1410 then transmits the tag response 1416 to the reader 1420.

The reader 1420 then transmits (1422) the identifier 1412, the tag challenge 1414, the response 1416, and optionally any indicators of tag-generated randomness (e.g., a tag IV) to a verification authority 1430 over one or more networks 1450. The verification authority 1430 stores or has access to information about the tag 1410, such as its secret and/or the encryption algorithm it uses. The verification authority 1430 then uses this information, the received identifier 1412, tag challenge 1414, and response 1416 to determine if the tag is authentic. For example, in one embodiment, the verification authority 1430 may use the received identifier to find and access a local copy of the tag's stored secret/key, compute a response from the secret/key and the received tag challenge, and compare the computed response with the actual, received tag response. If the two responses match, the tag is authentic, and if the responses do not match, the tag is not authentic. The verification authority 1430 may then optionally send a message 1424 to the reader 1420 via network(s) 1450 confirming or refuting the authenticity of the tag (or an item it is attached to).

In some embodiments, the message 1422 transmitted by the reader 1420 to the verification authority 1430 may include the physical location of reader 1420 when the challenge was issued to the tag 1410. The message 1422 may also include a reader identifier, and/or may be signed with an electronic signature. In some embodiments, the verification authority 1430 may require that reader 1420 authenticate itself before performing the tag authentication. For example, the verification authority 1430 may challenge the reader 1420, or may verify the identity of reader 1420 based on an electronic signature signing the message 1422.

The verification authority 1430 may also transmit a notification 1432 to one or more designated parties 1440 via network(s) 1450 indicating whether the authenticity of tag 1410 was confirmed or refuted. For example, a pharmaceutical distributor using an RFID-enabled handheld reader to interrogate a shipment (such as a case of medicine) may utilize a verification authority, which may send the reply to a designated party such as the distributor's security office or, in some instances, directly to the police in the event of counterfeit medicine. In some embodiments, the verification authority 1430 may electronically sign the notification 1432 to the designated party 1440.

In some embodiments, the verification authority 1430 may transmit a message to the reader 1420 if the authenticity of the tag 1410 is confirmed or refuted. In other embodiments, the verification authority 1430 may only transmit a message if tag authenticity is confirmed, if it is refuted, or may not transmit a message to the reader 1420 at all. The verification authority 1430 may also transmit a notification to designated part(ies) 1440 if the authenticity of the tag 1410 is confirmed or refuted, only if tag authenticity is confirmed, or only if tag authenticity is refuted.

In some embodiments, message 1424 and notification 1432 may be electronically signed by the verification authority 1430. For example, the verification authority may compute an electronic signature based on the message/notification to be transmitted, a key or secret associated with the verification authority, and a cryptographic algorithm, and attach the computed electronic signature to the message/notification. When an entity (e.g., reader 1420 or designated party 1440) receives the message/notification, it may use the electronic signature to validate the message/notification by determining (a) if the message/notification actually came from the verification authority, and (b) if the message/notification was altered during transmission from the verification authority. In one embodiment, the receiving entity may perform these determinations using a public key (related to the private key/secret used by the verification authority to compute the electronic signature).

As shown in diagram 1400, the verification authority 1430 communicates with the reader 1420 and the designated party 1440 over one or more networks 1450. The network(s) 1450 may be available in real-time, meaning that the reader 1420 can engage with the verification authority 1430 on a message-by-message basis, or the network(s) 1450 may be non-real-time, meaning that the reader 1420 stores or buffers its messages and transmits them to the verification authority 1430 when the network is available. Of course, the reader 1420 may also store and transmit messages to the verification authority 1430 on a network that is available in real-time.

In some embodiments, when the reader 1420 stores responses from multiple tags, the reader 1420 may configure its transmissions to the verification authority 1430 to take advantage of batch transmission. For example, tag challenge 1414 may be sent to multiple tags simultaneously. If the reader 1420 stores responses from multiple tags to a single tag challenge, the reader 1420 may first transmit a subset (one or more) of the stored responses but only one copy of the tag challenge to the verification authority 1430. Subsequently, the reader 1420 may transmit more of the stored responses, but no further tag challenges, to the verification authority 1430.

Figure 15:
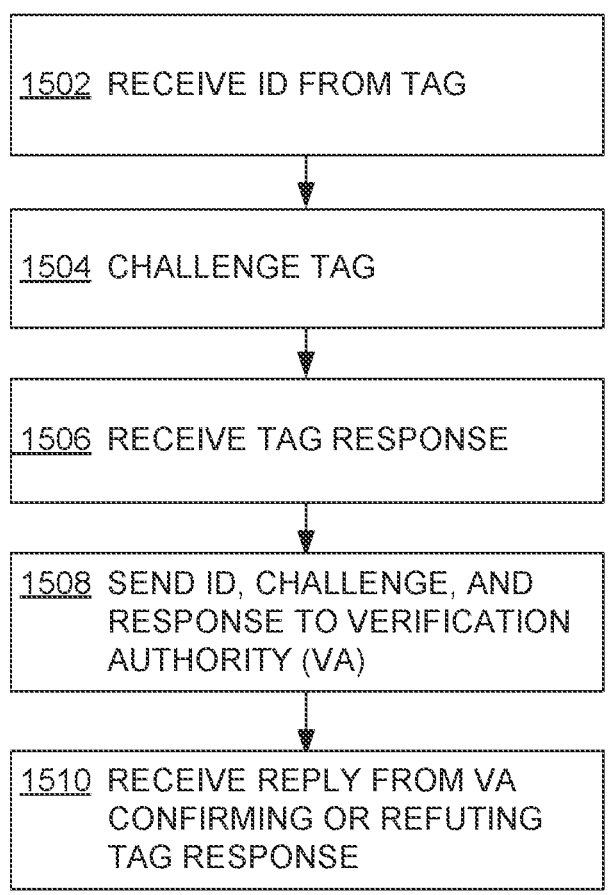
FIG. 15 is a flowchart illustrating a process for a reader authenticating a tag according to embodiments.

FIG. 15 is a flowchart illustrating a process 1500 for tag authentication according to embodiments. In step 1502, a reader (e.g., reader 1420 in FIG. 14) receives an identifier ID (e.g., ID 734/836 in FIGS. 7/8) from a tag (e.g., tag 1410 in FIG. 14). The reader then challenges the tag at step 1504 by transmitting a challenge to the tag (e.g., as part of authentication step 1008 in FIG. 10). In step 1506, the reader receives a challenge response from the tag. The reader then sends the ID, challenge, and response to a verification authority (e.g., verification authority 1430 in FIG. 14) in step 1508. Finally, in step 1510, the reader receives a reply from the verification authority confirming or refuting the tag response.

In some embodiments, a tag may itself wish to verify the authenticity of a reader before complying with commands from the reader. A tag may consider a reader authentic if the reader has access to a verification authority that has some knowledge of the tag (e.g., the tag TKEY and/or the tag's cryptographic algorithms) and/or knows the private key corresponding to a public key known by the tag. In order to determine whether a reader does in fact have access to such a verification authority, a tag may send a challenge to the reader, where a correct response to the challenge can only be generated by the verification authority. In some embodiments, the verification authority may also wish to verify the authenticity of a reader before responding to requests from the reader. Similar subject matter is described in commonly-assigned U.S. Pat. No. 8,866,594 issued on Oct. 21, 2014, the entirety of which is incorporated by reference herein.

Figure 16:
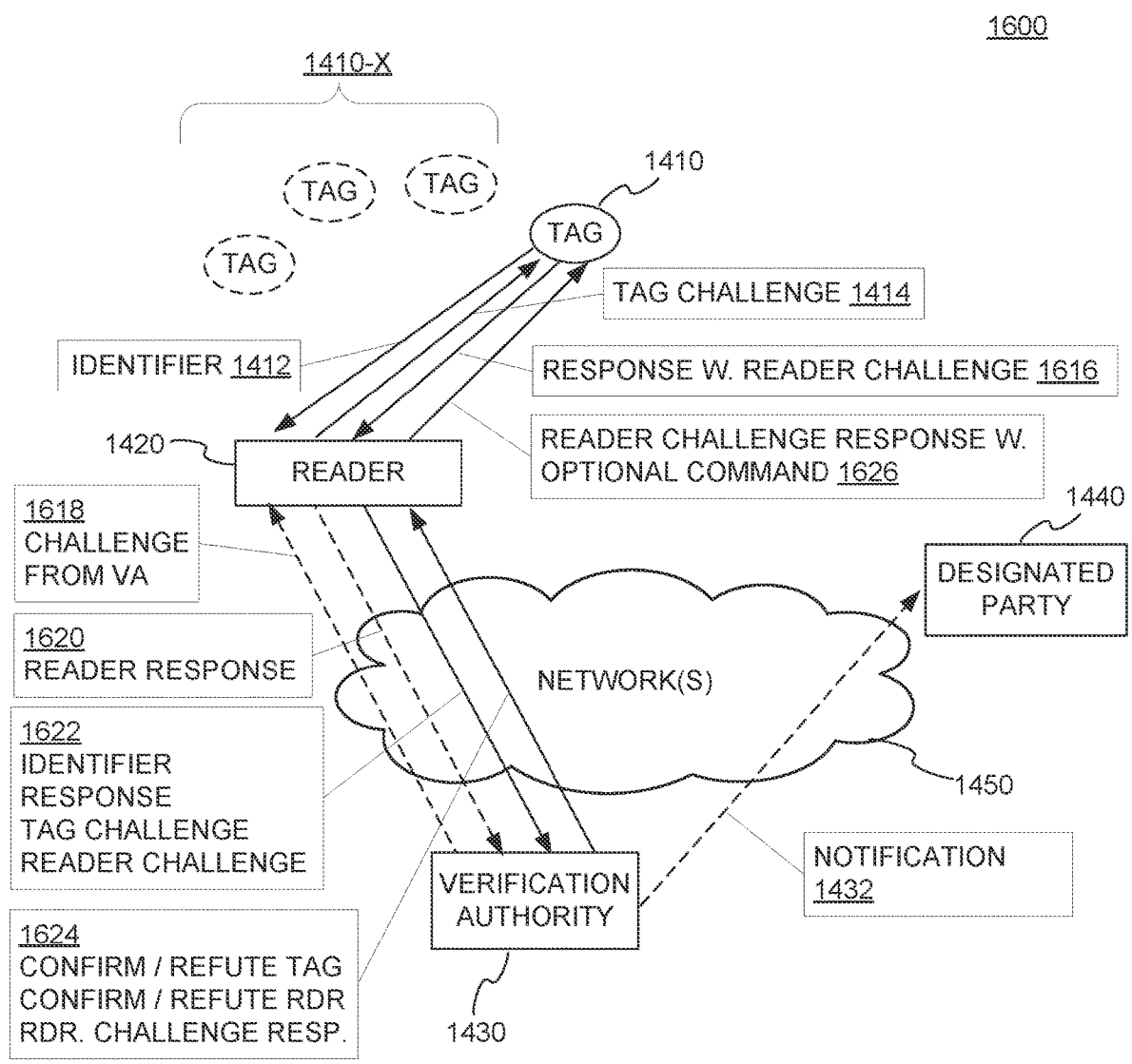
FIG. 16 is another diagram depicting interactions between an RFID reader, RFID tags, a verification authority, and a designated party according to embodiments.

FIG. 16 is another diagram 1600 depicting interactions between an RFID reader 1420, RFID tags 1410-X and 1410, a verification authority 1430, and a designated party 1440 according to embodiments. Diagram 1600 is similar to diagram 1400, with similarly-numbered elements behaving similarly. However, in diagram 1600 tag 1410 responds to the tag challenge 1414 by sending a reader challenge in addition to response 1616. Diagram 1600 depicts the reader challenge as included in response 1616, but in other embodiments the reader challenge may be in a different message. The reader challenge may include a first parameter that may be encrypted with a tag key (e.g., a tag private key TPRK or a tag secret key TKEY) or not. For example, the first parameter may include a random number generated by the tag or provided by reader 1420. Upon receiving response 1616, reader 1420 may determine that it includes a reader challenge by reading the included reader challenge or an included reader challenge indicator. Reader 1420 may then transmit a message 1622 with the identifier 1412, the tag challenge 1414, the response 1616, and optionally any indicators of tag-generated randomness (e.g., a tag IV) to verification authority 1430 over one or more networks 1450.

As mentioned above, in some embodiments the verification authority 1430 may need to authenticate reader 1420. In these embodiments, the verification authority 1430 transmits a challenge 1618 to the reader 1420, either before the verification authority 1430 receives message 1622 or in response to receiving message 1622. In response, the reader 1420 generates a reader response 1620, similar to how tag 1410 generates tag response 1616 (i.e., by using a stored reader secret, the reader challenge, and optionally reader-generated randomness). The reader 1420 then transmits the reader response 1620 to the verification authority 1430, either before transmitting message 1622, after transmitting message 1622, or along with (or embedded in) message 1622. In some embodiments, the reader 1420 also transmits the physical location of the reader when the challenge was issued to the tag 1410 and/or a reader identifier (not shown) to the verification authority 1430. In some embodiments, the reader 1420 may sign its transmitted messages with a reader electronic signature, which may help further indicate that the reader is legitimate/authentic.

In embodiments where the reader 1420 needs to be authenticated, the verification authority 1430 may wait to process the received message 1622 until the reader 1420 has been authenticated. The verification authority 1430 may authenticate the reader 1420 in the same way it authenticates received message 1622. For example, the verification authority 1430 may store or have access to information about the reader 1420 such as its secret and/or the cryptographic algorithm it uses, and may use this information, the challenge 1618, and the reader response 1620 to determine whether the reader 1420 is authentic (e.g., by computing a response and comparing it to the reader response 1620).

After the verification authority 1430 has determined the authenticity of the reader 1420, it may transmit a reader confirmation/refutation message to the reader 1420, either along with a tag confirmation/refutation message 1624 or separately. In some embodiments, instead of transmitting a reader confirmation/refutation message, the verification authority 1430 may use the tag confirmation/refutation message 1624 as a proxy. For example, if the reader 1420 is confirmed to be authentic, the verification authority 1430 may send the tag confirmation/refutation message 1624. If, on the other hand, the reader 1420 is not determined to be authentic, the verification authority 1430 may not send the tag confirmation/refutation message 1624. The verification authority 1430 may even transmit a false tag confirmation/refutation message 1624 if the reader 1420 is determined to not be authentic, and then optionally alert a third party of the not-authentic reader.

In some embodiments, if the verification authority 1430 transmits a reader confirmation/refutation message to the reader 1420, the verification authority 1430 may transmit a tag confirmation/refutation message if tag authenticity is confirmed, if it is refuted, or may not transmit a tag confirmation/refutation message to the reader 1420 at all.

Verification authority 1430 may further include an indication of whether the authenticity of reader 1420 was confirmed or refuted in notification 1432. Verification authority 1430 may transmit notification 1432 if the authenticity of the tag 1410/reader 1420 is confirmed or refuted, only if tag/reader authenticity is confirmed, or only if tag/reader authenticity is refuted.

If verification authority 1430 considers reader 1420 authentic, verification authority 1430 may derive a second parameter from the reader challenge and send the second parameter in a reader challenge response back to reader 1420, either as part of message 1624 or separately. Verification authority 1430, as described above, may store or have access to information about the tag 1410, such as its secret key TKEY and/or the encryption algorithm(s) it uses. In some embodiments, verification authority 1430 also (or instead) has access to a private key corresponding to a public key stored by tag 1410. Therefore, verification authority 1430 can reverse any cryptographic processing performed by tag 1410 on the first parameter in the reader challenge to derive a second parameter that tag 1410 (or another entity with the same information as tag 1410) can subsequently verify.

To derive the second parameter, verification authority 1430 may first determine the appropriate key to use for a particular tag based on identifier 1412. If the first parameter in the reader challenge is encrypted, verification authority 1430 then uses the key to recover the first parameter. Subsequently, verification authority 1430 may use the first parameter to derive a second parameter. For example, the second parameter may be set to be equal to the first parameter, include a string incorporating the first parameter, and/or include the result of an arithmetic or cryptographic function of the first parameter. The second parameter may be unencrypted or encrypted/electronically-signed with the determined key. For example, verification authority 1430 can derive the second parameter by decrypting an encrypted first parameter in the reader challenge, encrypting an unencrypted first parameter in the reader challenge, or electronically signing a response to the reader challenge.

Reader 1420 then receives message 1624 indicating tag authenticity, and also the reader challenge response (including the derived second parameter), either in message 1624 or separately. Reader 1420 can subsequently determine, based on message 1624, whether tag 1410 is authentic. If tag 1410 is determined to be authentic, reader 1420 may then transmit a message 1626 to tag 1410. Message 1626 specifies one or more actions for tag 1410 to perform, and includes at least a portion of the reader challenge response or the derived second parameter. If message 1624 refutes the authenticity of tag 1410, reader 1420 may not send message 1626 or any portion of the reader challenge response or the derived second parameter to tag 1410.

Assuming that tag 1410 is determined to be authentic, after receiving message 1626, tag 1410 can use its secret key or a verification authority public key to verify that the received reader challenge response portion or derived second parameter portion is authentic, and that reader 1420 is therefore authentic or authorized. For example, if tag 1410 originally sent an encrypted first parameter, it can check if the received second parameter portion is valid by comparing it to the original, unencrypted first parameter. Likewise, if tag 1410 originally sent an unencrypted first parameter, it can check if the received second parameter portion corresponds to at least part of the unencrypted first parameter. If the reader challenge response includes an electronic signature, tag 1410 may verify the electronic signature using its TKEY (for message authentication codes) or the verification authority public key (for digital signatures).

If tag 1410 determines that reader 1420 is authentic or authorized, then tag 1410 may perform the action(s) specified by message 1626. This allows reader 1420 to cause tag 1410 to perform otherwise restricted actions, such as reading to or writing from protected tag memory, adjusting certain tag counter values, adjusting a pointer to a memory location, adjusting a pointer to or the value of a key stored on the tag, or entering different tag operating states, without reader 1420 needing to know or provide a tag password.

Message 1626 may specify actions via any suitable method. For example, message 1626 may include one or more commands that specify one or more actions. In some embodiments, a single command specifies one or more actions. In other embodiments, a single action is specified by the combination of two or more commands, such that a tag only performs the action upon receipt of all of the commands in the combination. The Access and Kill commands in the Gen2 Specification are examples of such commands. If a single action is specified by the combination of multiple commands, a message such as message 1626 may include only a subset of the combination. For example, if the action is specified by the combination of two commands, a single message may only include one of the commands, and a tag may not perform the specified action until a reader sends it two messages, each including one of the commands in the combination.

Even if a tag receives all of the commands that specify a particular action, the tag may not perform the action without authenticating the requesting entity. Authentication may occur as described above, where the tag initially sends a first parameter to a reader, the reader subsequently sends a second parameter derived from the first parameter back to the tag, and the tag determines whether the second parameter is correctly derived from the first parameter. When multiple messages or commands are required to specify an action, the reader may include the entire second parameter with each message/command, or the reader may include a portion of the second parameter with each message/command. For example, if first and second commands are required to specify a particular action, the reader may send a first portion of the second parameter with the first command and a second portion of the second parameter with the second command. The different portions of the second parameter may be contiguous, overlapping, interleaved, or be formed from any subsets of the second parameter. The tag, upon receiving the multiple messages/commands, may then reassemble the different portions of the second parameter and determine whether the reassembled second parameter is correctly derived from the first parameter. If so, the tag may then perform the requested or specified action. If not, the tag may not perform the requested or specified action, and may either refrain from responding to the reader or indicate that an error has occurred. The tag may have a priori knowledge of how the different portions of the second parameter are to be reassembled, or may receive the knowledge from the reader, for example as part of the command(s) or message(s).

Figure 17:
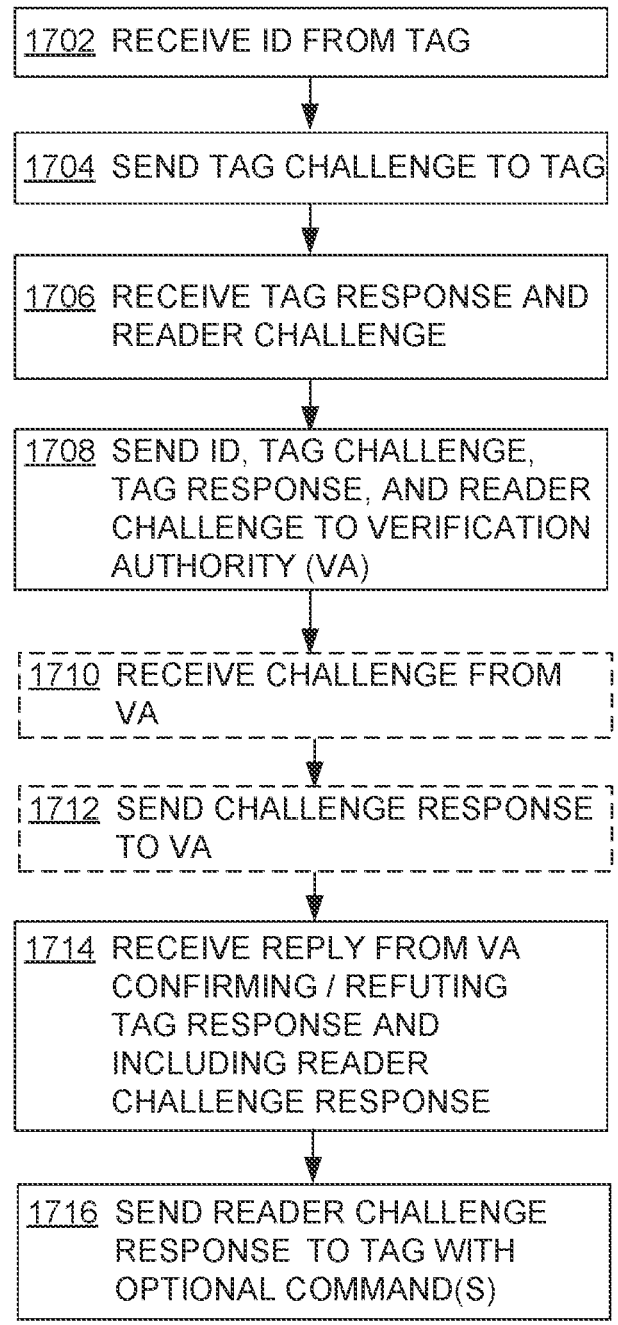
FIG. 17 is a flowchart illustrating a process for a reader authenticating itself and a tag according to embodiments.

FIG. 17 is a flowchart 1700 illustrating a process for a reader authenticating itself and a tag according to embodiments. At operation 1702, the reader receives an ID from a tag. At operation 1704, the reader sends a tag challenge to the tag. At operation 1706, the reader receives a tag response and a reader challenge from the tag. At operation 1708, the reader sends the ID, the tag challenge, the tag response, and the reader challenge to a verification authority. In some embodiments, the reader may not send the tag challenge to the verification authority, for example if the verification authority already knows the tag challenge. At optional operation 1710, the reader may receive a challenge from the verification authority for verifying reader authenticity. In response, at optional operation 1712 the reader may send a response to the verification authority challenge to the verification authority. At operation 1714, the reader receives a reply from the verification authority confirming or refuting the authenticity of the tag response, as well as including a response to the reader challenge. At operation 1716, the reader sends the reader challenge response to the tag, either alone or in combination with one or more optional tag commands as described above. In some embodiments, the reader may refrain from sending the reader challenge response and/or the optional tag command(s) if the verification authority indicates that the tag is not authentic.

In some embodiments, if the verification authority determines that the tag response is incorrect, it may not send a refuting reply to the reader, and may also not send a response to the reader challenge. In this situation, the reader may not perform operation 1712. If the verification authority does send a refuting reply and also a reader challenge response to the reader, the reader may still not send the reader challenge response to the tag because its authenticity has not been verified.

Figure 18:
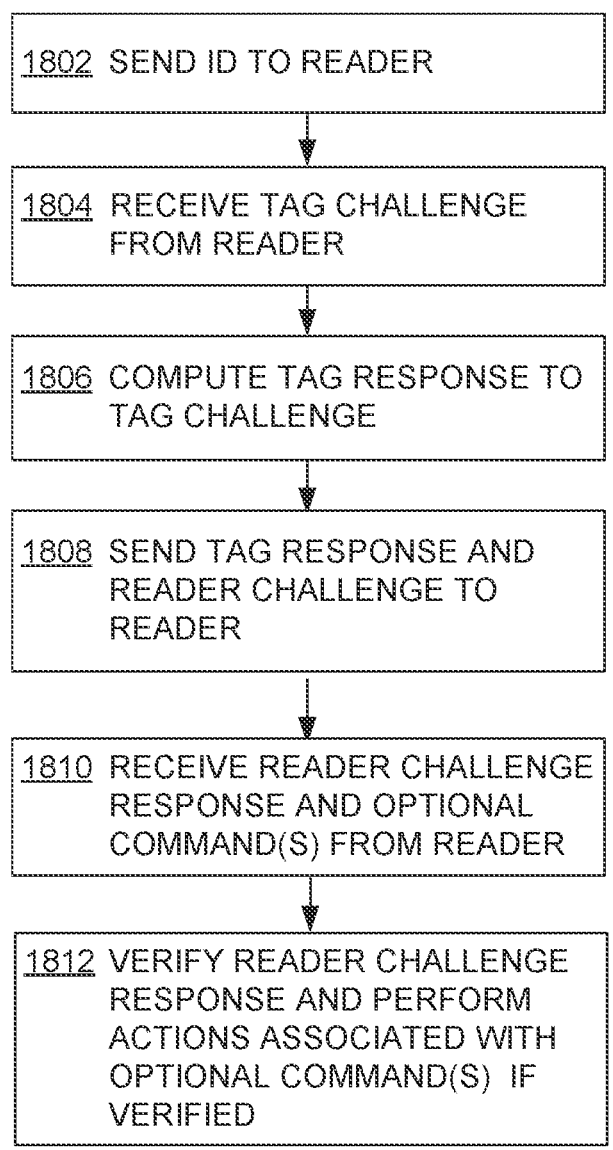
FIG. 18 is a flowchart illustrating a process for a tag to authenticate a reader according to embodiments.

FIG. 18 is a flowchart illustrating a process 1800 for a tag to authenticate a reader according to embodiments. At operation 1802, the tag sends an ID to a reader. At operation 1804, the tag receives a tag challenge from the reader. In response, the tag computes a tag response to the tag challenge at operation 1806. At operation 1808, the tag sends the computed tag response, as well as a reader challenge, to the reader. The reader challenge may include a first parameter such as a tag random number, and may be computed along with the tag response in operation 1806, may be computed beforehand, or may be computed after the tag response. Subsequently, at operation 1810 the tag receives a reader challenge response and one or more optional commands from the reader. At operation 1812, the tag first verifies the reader challenge response as described above (e.g., using TKEY or a verification authority public key), and in response to successfully verifying the reader challenge response performs one or more actions associated with the command(s). In some embodiments, the tag may wait to perform the actions until another command is received and/or some trigger event occurs (e.g., tag power-up, tag power-down, timer expiration, or any other suitable event), which may be specified by the command(s) or otherwise known to the tag.

The operations described in processes 1000, 1100, 1200, 1300, 1500, 1700, and 1800 are for illustrative purposes only. An RFID tag or reader authentication process may be implemented using additional or fewer operations and in different orders using the principles described herein.

Figure 19:
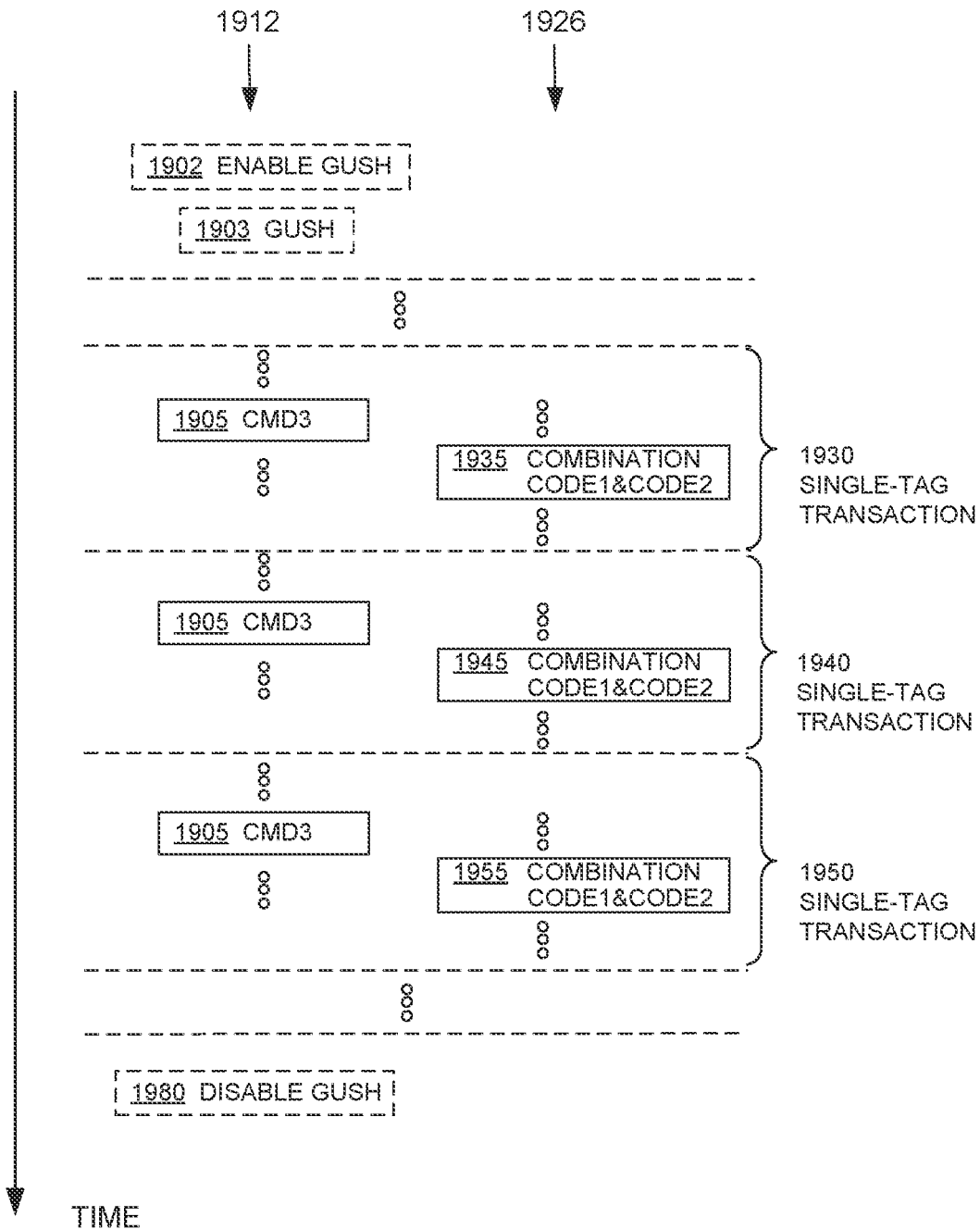
FIG. 19 is a timing diagram showing commands from an RFID reader and responses from a population of RFID tags for reading combinations of first and second codes of the tags according to embodiments.

In some embodiments, a tag IC may be configured to backscatter multiple codes (e.g., an ID, a coupon, electronic signatures, a TPK, or any other suitable code) in combination instead of one at a time, as described in U.S. Pat. No. 8,390,431 issued on Mar. 5, 2013, which has been incorporated by reference. FIG. 19 is a timing diagram 1900 showing commands from an RFID reader and replies by a population of RFID tags according to embodiments. Neither the reader nor the tags are shown in diagram 1900. In some embodiments, the tags may store a first code and a second code (e.g., an ID, a coupon, electronic signatures, a TPK, or any other suitable codes). The commands in diagram 1900 cause tags to "gush" a reply comprising combinations of first and second codes, without any intervening reader commands between them, according to embodiments.

Timing diagram 1900 proceeds downward along a vertical axis TIME, with commands 1912 transmitted by the reader alternating with replies 1926 from the tags. In the example of diagram 1900, the reader first instructs the tags to gush their replies by means of one or more of an optional ENABLE GUSH command 1902 and a GUSH command 1903. In some embodiments, at least one of the optional ENABLE GUSH command 1902 and the GUSH command 1903 may be broadcast simultaneously to multiple tags. Only one tag replies at a time, while the other tags are silent. During the time each tag is singulated the reader has a transaction with the singulated tag and receives tag data. Three example transactions 1930, 1940, and 1950 are described, but more or less such transactions may take place. Each transaction 1930, 1940, and 1950 is not necessarily described in full, but only some pertinent commands are given. Not shown are commands, for example, to singulate each tag for its transaction. Finally, an optional DISABLE GUSH command 1980, which may be broadcast to multiple tags, may terminate the gushing behavior.

In first transaction 1930 with a first singulated tag, command CMD3 1905 causes the first tag to send a reply comprising a combination 1935 of at least a portion of code1 and at least a portion of code2 from tag memory, without the tag receiving a reader command in-between sending the two code portions. In transaction 1940 with a second singulated tag, a repeated command CMD3 1905 elicits a combination 1945 from the second tag, again with no intervening command. Then in transaction 1950 with a third singulated tag, a repeated command CMD3 1905 elicits a combination 1955 from the third tag, again with no intervening command.

In some embodiments transactions 1930, 1940, and 1950 may take less time than transactions that involve receiving the first code and the second code separately, with an intervening reader command in between.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A Radio Frequency Identification (RFID) reader configured to cause an RFID integrated circuit (IC) having a first parameter to execute an action, the reader comprising:
   a transceiver configured to communicate with RFID ICs; and a processing block configured to:
cause the transceiver to send a first command to the RFID IC;
receive, via the transceiver and from the RFID IC, at least an identifier and an encrypted version of the first parameter;
determine a key using the received identifier;
recover the first parameter from the encrypted version using the key;
cause the transceiver to send to the IC a single second command including at least a first portion of the first parameter, wherein:
the second command at least partly causes the IC to execute an IC action defined by at least the second command upon verifying at least the first portion of the first parameter.

2. The RFID reader of claim 1, wherein the processing block is further configured to cause the transceiver to send to the IC a single third command including at least a second portion of the first parameter, wherein:
the first and second portions are different,
the IC action is defined by at least the second and third commands, and
the second command at least partly causes the IC to execute the IC action upon verifying at least the first and second portions.

3. The RFID reader of claim 1, wherein the processing block is configured to determine the key and recover the first parameter by:
sending the encrypted version of the first parameter to a verification authority, and
receiving the first portion of the first parameter from the verification authority, wherein the verification authority determines the key and recovers the first parameter from the encrypted version.

4. The RFID reader of claim 1, wherein the processor processing block is further configured to:
cause the transceiver to send a random number to the RFID IC with the first command;
receive, via the transceiver and from the RFID IC, a cryptographic function of the random number;
verify an authenticity of the RFID IC using the cryptographic function; and
cause the transceiver to send the single second command to the RFID IC only if the authenticity of the RFID IC is verified.

5. The RFID reader of claim 1, wherein the IC action includes at least one of:
reading from an IC memory;
writing to an IC memory;
adjusting an IC counter value;
adjusting a pointer to a memory location;
adjusting a value of a key; and
changing an IC state.

6. The RFID reader of claim 1, wherein the second command and at least one of a third command and a trigger event cause the RFID IC to execute the IC action.

7. A method for a Radio Frequency Identification (RFID) system to cause an RFID integrated circuit (IC) having a first parameter to execute an action, the method comprising:
causing a transceiver of an RFID reader to send a first command to the RFID IC;
receiving, via the transceiver, at least an identifier and an encrypted version of the first parameter from the RFID IC;
determining, at a processing block, a key using the received identifier;
recovering, at the processor, the first parameter from the encrypted version using the key;
deriving, at the processor, a second parameter from the first parameter; and
causing the transceiver of the RFID reader to send to the IC a single second command including at least a portion of the second parameter and defining at least part of an IC action, wherein:
at least the second command causes the IC to, upon verifying at least the first portion of the second parameter using the first parameter, execute the IC action; and
the first parameter and the second parameter do not define the IC action.

8. The method of claim 7, further comprising:
causing the transceiver to send to the IC a single third command including at least a second portion of the first parameter, wherein:
the first and second portions are different,
the IC action is defined by at least the second and third commands, and
the second command at least partly causes the IC to execute the IC action upon verifying at least the first and second portions.

9. The method of claim 7, wherein determining the key, recovering the first parameter, and deriving the second parameter comprises:
the processing block sending the encrypted version of the first parameter to a verification authority, and
the processing block receiving the derived second parameter from the verification authority, wherein the verification authority determines the key, recovers the first parameter from the encrypted version, and derives the second parameter from the first parameter.

10. The method of claim 7, further comprising:
causing the transceiver to send a random number to the RFID IC with the first command;
receiving, via the transceiver, a cryptographic function of the random number from the RFID IC;
the processing block verifying an authenticity of the RFID IC using the cryptographic function; and
causing the transceiver to send the single second command to the RFID IC only if the authenticity of the RFID IC is verified.

11. The method of claim 10, wherein verifying the authenticity of the RFID IC comprises:
the processing block causing the cryptographic function to be sent to a verification authority; and
the processing block receiving an indication of tag authenticity from the verification authority.

12. The method of claim 7, wherein the IC action includes at least one of:
reading from an IC memory;
writing to an IC memory;
adjusting an IC counter value;
adjusting a pointer to a memory location;
adjusting a value of a key; and
changing an IC state.

13. The method of claim 7, wherein the second command and at least one of a third command and a trigger event cause the RFID IC to execute the IC action.

14. A Radio Frequency Identification (RFID) component configured to cause an RFID integrated circuit (IC) having a first parameter to execute an action, the RFID component comprising:
  a processing block configured to:
    cause a transceiver configured to communicate with RFID ICs to send a first command to the RFID IC;
    receive, via the transceiver and from the RFID IC, at least an identifier and an encrypted version of the first parameter;
    determine a key using the received identifier;
    recover the first parameter from the encrypted version using the key;
    derive a second parameter from the first parameter; and
    cause the transceiver to send to the IC a single second command including at least a portion of the second parameter and defining at least part of an IC action, wherein:
      at least the second command causes the IC to, upon verifying at least the first portion of the second parameter using the first parameter, execute the IC action; and
      the first parameter and the second parameter do not define the IC action.

15. The RFID component of claim 14, wherein the processor processing block is further configured to cause the transceiver to send to the IC a single third command including at least a second portion of the first parameter, wherein:
  the first and second portions are different,
  the IC action is defined by at least the second and third commands, and
  the second command at least partly causes the IC to execute the IC action upon verifying at least the first and second portions.

16. The RFID component of claim 14, wherein the processing block is configured to determine the key, recover the first parameter, and derive the second parameter by:
  sending the encrypted version of the first parameter to a verification authority, and
  receive the derived second parameter from the verification authority, wherein the verification authority determines the key, recovers the first parameter from the encrypted version, and derives the second parameter from the first parameter.

17. The RFID component of claim 14, wherein the processing block is further configured to:
  cause the transceiver to send a random number to the RFID IC with the first command;
  receive, via the transceiver and from the RFID IC, a cryptographic function of the random number;
  verify an authenticity of the RFID IC using the cryptographic function; and
  cause the transceiver to send the single second command to the RFID IC only if the authenticity of the RFID IC is verified.

18. The RFID component of claim 17, wherein the processing block is configured to verify the authenticity of the RFID IC by:
  causing the cryptographic function to be sent to a verification authority; and
  receiving an indication of authenticity from the verification authority.

19. The RFID component of claim 14, wherein the IC action includes at least one of:
  reading from an IC memory;
  writing to an IC memory;
  adjusting an IC counter value;
  adjusting a pointer to a memory location;
  adjusting a value of a key; and
  changing an IC state.

20. The RFID component of claim 14, wherein the second command and at least one of a third command and a trigger event cause the RFID IC to execute the IC action.

* * * * *

UNITED STATES PATENT AND TRADEMARK OFFICE
CERTIFICATE OF CORRECTION

| | | |
|---|---|---|
| PATENT NO. | : 12,169,752 B1 | Page 1 of 1 |
| APPLICATION NO. | : 17/837083 | |
| DATED | : December 17, 2024 | |
| INVENTOR(S) | : Matthew Robshaw and Christopher J. Diorio | |

It is certified that error appears in the above-identified patent and that said Letters Patent is hereby corrected as shown below:

In the Specification

In Column 9, Line 32, Delete ""R4T","  and insert -- "R→T", --, therefor.

In Column 9, Line 33, Delete ""T4R"."  and insert -- "T→R". --, therefor.

In Column 9, Line 34, Delete "R4T" and insert -- R→T --, therefor.

In Column 9, Line 35, Delete "T4R" and insert -- T→R --, therefor.

In Column 16, Line 10, Delete "trade" and insert -- global trade --, therefor.

In Column 22, Line 39, Delete "FIG." and insert -- FIGS. --, therefor.

In Column 22, Line 40, Delete "F( )response" and insert -- F() response --, therefor.

In Column 29, Line 34, Delete "and or" and insert -- and/or --, therefor.

In the Claims

In Column 31, Line 36-37, In Claim 4, delete "processor processing" and insert -- processing --, therefor.

In Column 33, Line 25 (Approx.), In Claim 15, delete "processor processing" and insert -- processing --, therefor.

Signed and Sealed this
Twenty-second Day of April, 2025

Coke Morgan Stewart
*Acting Director of the United States Patent and Trademark Office*